United States Patent
Katoh et al.

(10) Patent No.: US 7,117,773 B2
(45) Date of Patent: *Oct. 10, 2006

(54) TURRET FOR TURRET LATHE

(75) Inventors: Koichiro Katoh, Aichi-ken (JP); Kazuo Kawasaki, Aichi-ken (JP); Naoya Tanaka, Gifu-ken (JP); Minoru Kitayama, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 587 days.

This patent is subject to a terminal disclaimer.

(21) Appl. No.: 10/607,394

(22) Filed: Jun. 26, 2003

(65) Prior Publication Data

US 2004/0003690 A1    Jan. 8, 2004

(30) Foreign Application Priority Data

Jun. 28, 2002  (JP) .............................. 2002-190186

(51) Int. Cl.
   *B23B 29/32*  (2006.01)
(52) U.S. Cl. .......................................... 82/121; 82/159
(58) Field of Classification Search .................. 82/121, 82/157, 158, 159, 161; 29/32
   See application file for complete search history.

(56) References Cited

U.S. PATENT DOCUMENTS

| | | |
|---|---|---|
| 4,640,166 A | 2/1987 | Mizukado et al. |
| 4,769,885 A | 9/1988 | Nakano et al. |
| 4,782,438 A | 11/1988 | Mizukado et al. |
| 4,949,444 A | 8/1990 | Kojima et al. |
| 5,006,685 A | 4/1991 | Hatano et al. |
| 5,045,664 A | 9/1991 | Nakagawa et al. |
| 5,058,029 A | 10/1991 | Uemura et al. |
| 5,088,361 A | 2/1992 | Kojima et al. |
| 5,095,598 A | 3/1992 | Hiroshi et al. |
| 5,097,575 A | 3/1992 | Mitsukuchi et al. |
| 5,107,730 A | 4/1992 | Muraki et al. |
| 5,115,546 A | 5/1992 | Mitsukuchi et al. |
| 5,157,824 A | 10/1992 | Hiroshi et al. |
| 5,168,609 A | 12/1992 | Kojima et al. |
| 5,175,914 A | 1/1993 | Mitsukuchi et al. |
| 5,191,817 A * | 3/1993 | Kojima et al. ............... 82/1.11 |
| 5,254,068 A | 10/1993 | Yamada et al. |
| 5,310,396 A | 5/1994 | Momoi et al. |
| 5,946,992 A * | 9/1999 | Ozawa .......................... 82/48 |
| 6,453,782 B1 * | 9/2002 | Yamazaki et al. ............ 82/118 |
| 6,483,075 B1 | 11/2002 | Yamazaki et al. |
| 6,502,487 B1 | 1/2003 | Yamazaki et al. |
| 6,536,317 B1 | 3/2003 | Yamazaki et al. |
| 6,565,497 B1 * | 5/2003 | Yamazaki et al. ............ 483/11 |
| 6,612,004 B1 | 9/2003 | Yamazaki et al. |
| 6,865,789 B1 * | 3/2005 | Katoh et al. ................... 29/40 |

* cited by examiner

*Primary Examiner*—Willmon Fridie, Jr.
(74) *Attorney, Agent, or Firm*—Duane Morris LLP

(57) ABSTRACT

A turret body is provided with a tool spindle for detachably attaching a complex tool so as to be freely rotated with an axial center as its center. The turret body is provided with indexing means for indexing the tool spindle, and clamping means for clamping the tool spindle at an indexed position indexed by the indexing means. The turret body has a function for indexing the tool spindle for attaching the complex tool thereto and a function for clamping, thereby using the complex tool in a turret lathe.

18 Claims, 19 Drawing Sheets

FIG. 3
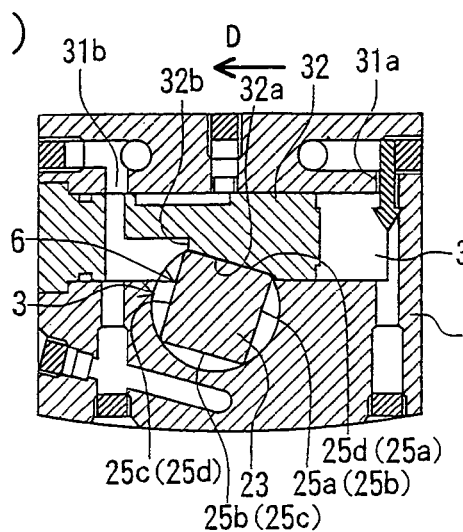
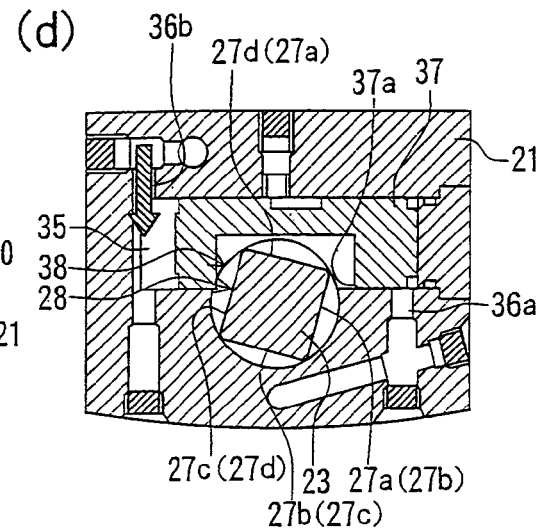
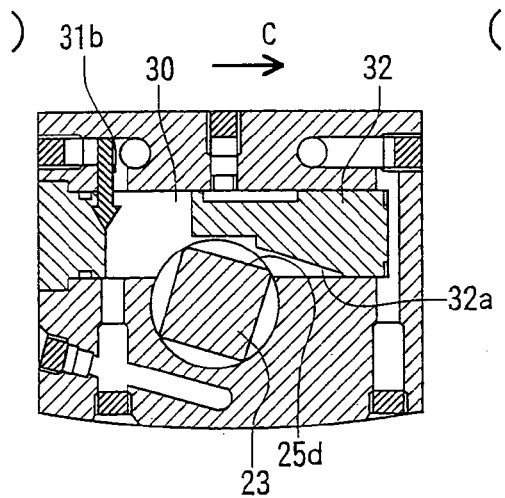
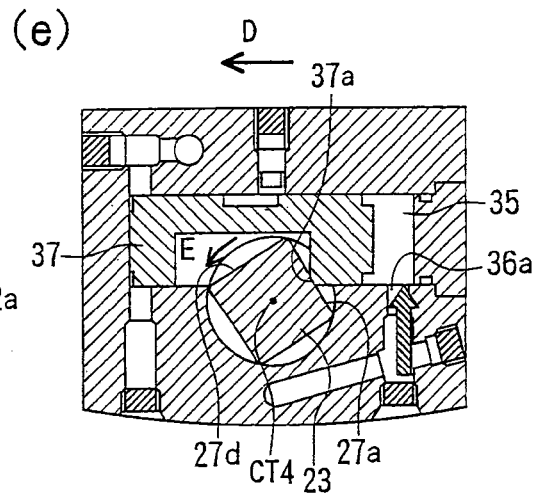
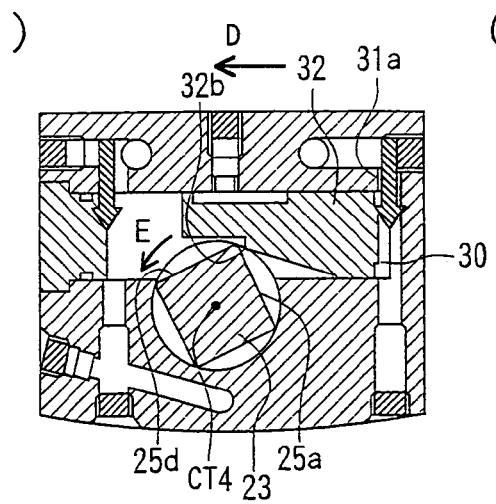
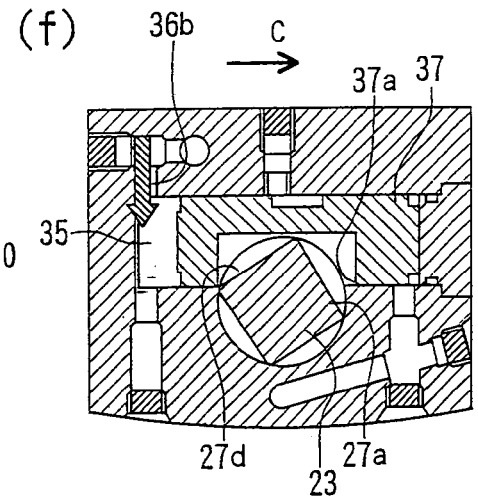

FIG. 6
(a)
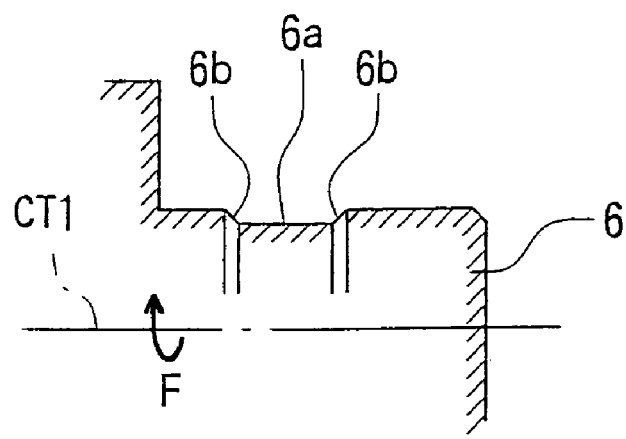
(b)
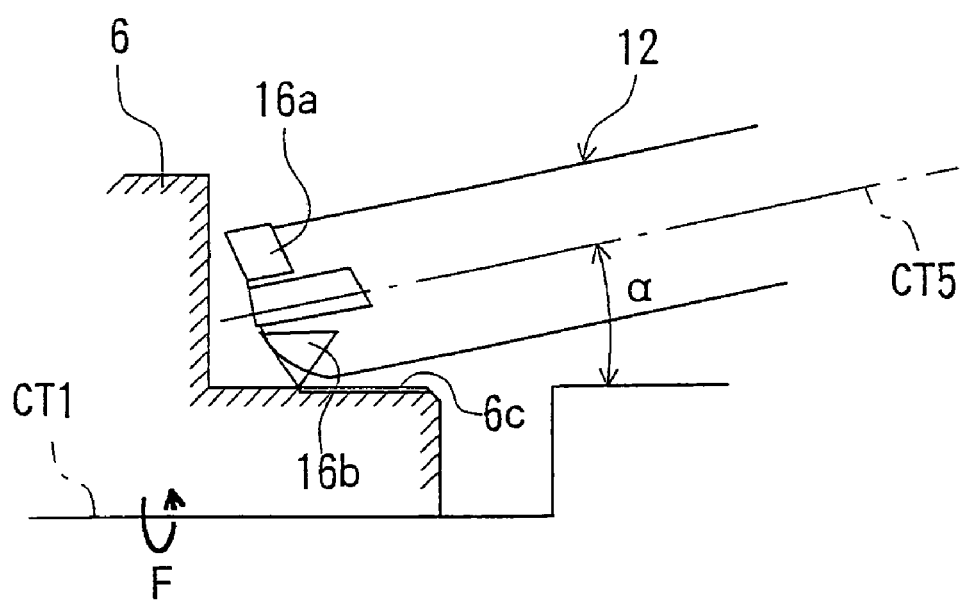

FIG. 7
(a)
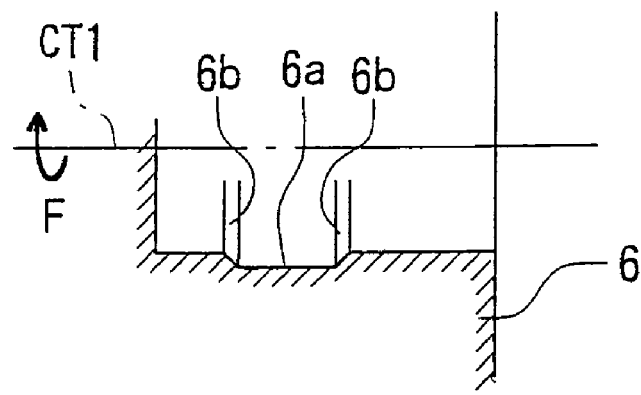
(b)
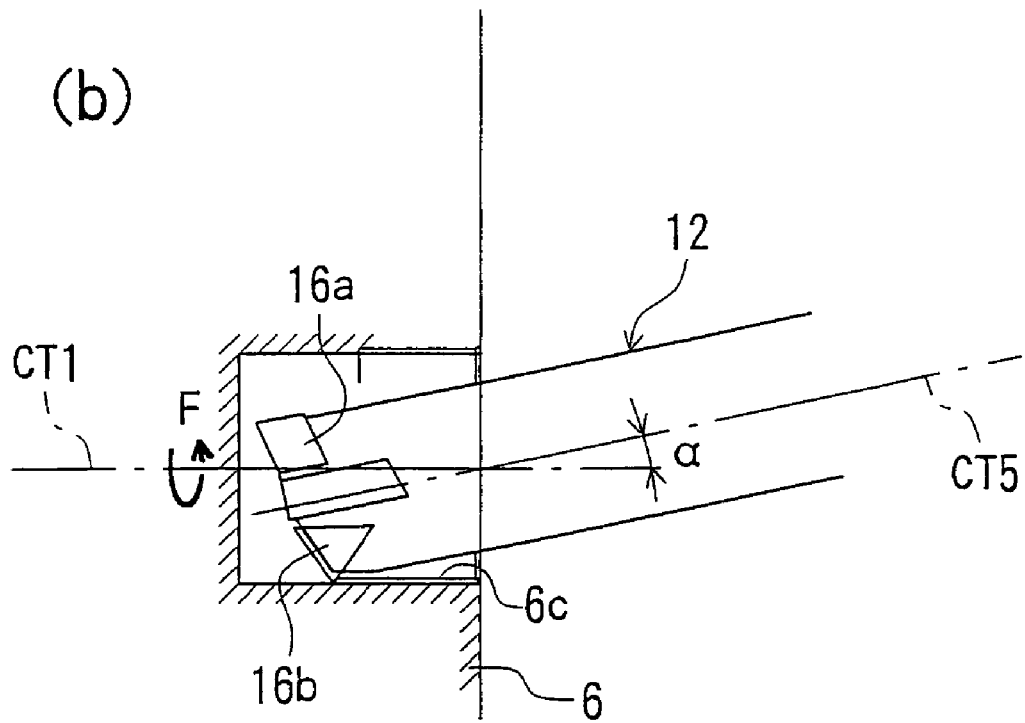

TURRET FOR TURRET LATHE

BACKGROUND OF THE INVENTION

This invention relates to a turret for turret lathe, and more specifically relates to a turret for turret lathe (simply "the turret" hereinafter) useful for attaching a complex tool installing a plurality of cutting edges thereon.

In a turret lathe, the number of tool installing faces of a turret limits the number of tools to be attached to the turret. For this reason, an ATC lathe equipped with an automatic tool exchanger (ATC), expensive rather than the turret lathe, has been used when the number of the tools necessary for machining is more than the number of the tool installing faces.

In order to soften this limitation, a complex tool having a plurality of cutting edges located on a single body has been proposed. But, such complex tool can not be used in the turret lathe since the turret has no indexing function for selecting a desired cutting edge from the complex tool. Besides, high frequency in exchange of tool increases the time for exchange of tool in the ATC lathe, and the time necessary for machining excluding the time for cutting a workpiece is longer, and the machining efficiency is then lowered.

Under the above-mentioned circumstances, the development of a turret for turret lathe wherein the complex tool can be used, for exchanging a tool in a short time, has been desired.

SUMMARY OF THE INVENTION

The invention has
a turret body;
a tool spindle for detachably attaching a complex tool, rotatable with an axial center of the tool spindle as its center, provided at the turret body;
indexing means for indexably rotating the tool spindle, provided at the turret body; and
clamping means for clamping the tool spindle at an indexed position indexed by the indexing means, provided at the turret body.

The turret body has the function for indexing the tool spindle to which the complex tool is attached by its rotation, and the function for clamping the tool spindle in this way, thereby using the complex tool in a turret lathe. And, time for exchange of the cutting edge by the indexing function (indexing) is shorter than the tool exchange time by an ATC, and the machining efficiency in the turret lathe can be improved thereby.

According to an aspect of the invention, the indexing means has a plurality of engagement portions formed at a periphery of the tool spindle, corresponding to the indexed position, and an actuator for rotating and driving the tool spindle a predetermined angle by engaging with the engagement portion, provided so as to be reciprocated and driven.

In this way, the complex tool is indexed by a reciprocating operation of the actuator, thereby certainly indexing the complex tool with a simple control.

According to another aspect of the invention, the clamping means has a clamp face provided at the actuator so as to freely engage with the engagement portion of the tool spindle.

In this way, the clamp face of the actuator is contacted with the operation portion of the tool spindle so as to clamp the complex tool. Then, the complex tool can be certainly clamped at the indexed position, the clamping rigidity can be improved, and the machining accuracy with the complex tool can be improved.

According to another aspect of the invention, the turret body is provided with first means for rotating and driving, and a spindle housing for supporting the tool spindle is located so as to be freely rotated and driven with an axial center as its center, orthogonal to an axial center of the tool spindle, by the first means for rotating and driving.

According to this, the first means for rotating and driving can rotate and drive the spindle housing supporting the tool spindle, to which the complex tool is attached, in the B-axis direction, thereby broadening the machining bounds by the complex tool.

According to another aspect of the invention, the indexing means is provided with second means for rotating and driving located at the spindle housing, for freely rotating and driving the tool spindle with the axial center of the tool spindle as its center.

In this way, the means for indexing the tool spindle is the second means for rotating and driving, which is located at the housing supporting the tool spindle, thereby simplifying the structure of the turret body.

According to another aspect of the invention, the second means for rotating and driving functions as indexing means for indexing the tool spindle by rotation and milling drive means for successively rotating the tool spindle, thereby executing milling machining by the complex tool.

In this way, the second means for rotating and driving can index the tool spindle by its rotation, and can successively rotate. Therefore, milling machining by the complex tool is possible by using the second means for rotating and driving in addition to turning machining, thereby further broadening the machining bounds by the complex tool.

According to another aspect of the invention, the spindle housing is free to be attached to and detached from the turret body.

As mentioned above, the turret and the housing can be separately produced, thereby easily producing the turret and the housing.

According to another aspect of the invention, the turret body is provided with a third means ford rotating and driving such that the third means for rotating and driving can rotate the tool spindle with the axial center of the tool spindle as its center.

In this way, the third means for rotating and driving is located at the turret body, thereby making the spindle housing smaller and improving operability of the turret lathe.

According to another aspect of the invention, the third means for rotating and driving functions as the indexing means, and milling drive means for successively rotating the tool spindle, thereby executing milling machining by the complex tool.

In this way, the third means for rotating and driving can index the tool spindle by its rotation, and can successively rotate. Therefore, milling machining by the complex tool is possible in addition to turning machining, thereby further broadening the machining bounds by the complex tool.

BRIEF DESCRIPTION OF THE DRAWINGS

FIG. 3 shows index rotational mechanism of the complex tool in FIG. 2 and processes of its indexing, wherein each of (a) through (c) is a sectional view of I—I of FIG. 2, and each of (d) through (f) is a sectional view of II—II of FIG. 2;

FIG. 6 shows a machining on an outer diameter of a workpiece by the complex tool supported by the turret according to the invention, wherein (a) is a schematic view showing grooving machining on an outer diameter and (b) is a schematic view showing threading machining on an outer diameter;

FIG. 7 shows a machining on an inner diameter of a workpiece by the complex tool supported by the turret according to the invention, wherein (a) is a schematic view showing grooving machining on an inner diameter and (b) is a schematic view showing threading machining on an inner diameter;

DESCRIPTION OF THE PREFERRED EMBODIMENT

Embodiments of the invention will now be explained, referring to the appended drawings.

Figure 1:
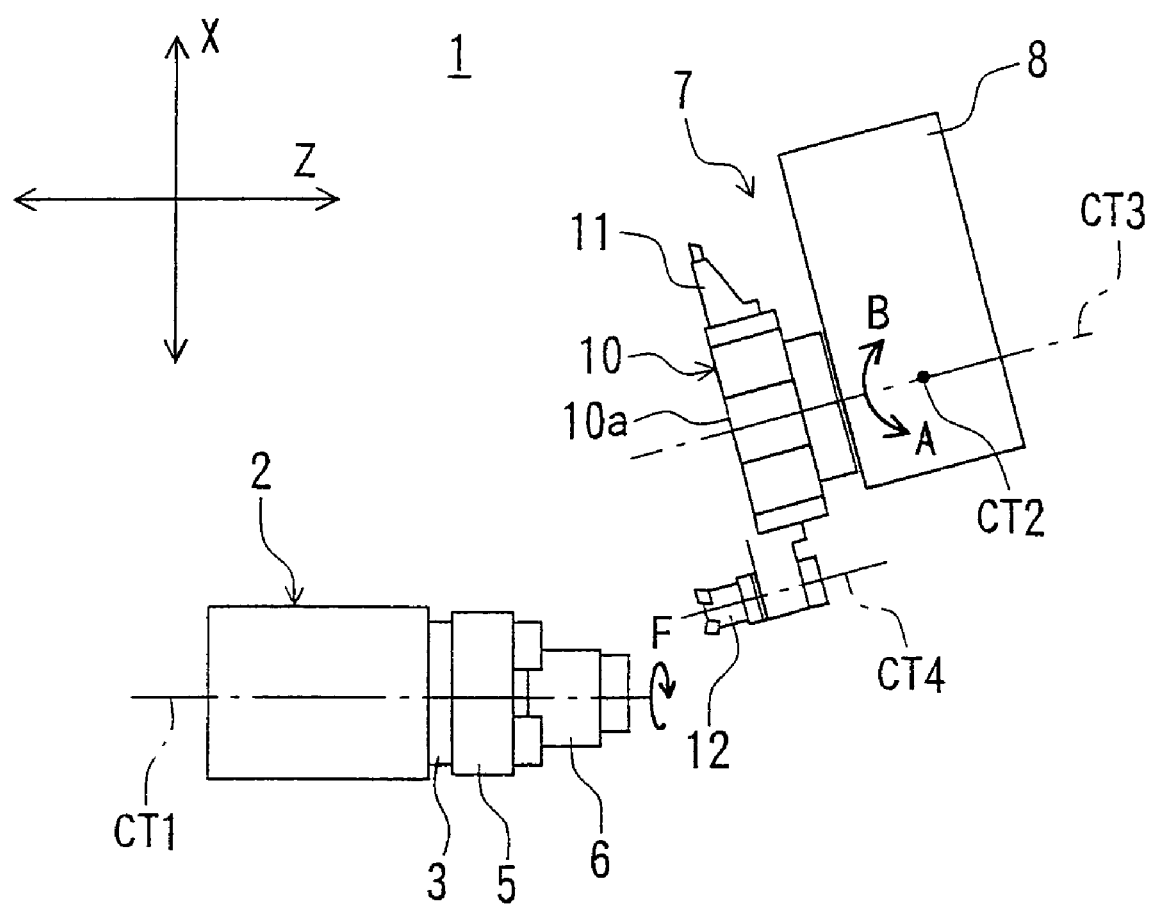
FIG. 1 shows an instance of a turret lathe having a turret according to the invention, and is a plan view showing a positional relation between a spindle stock and a tool rest.

As shown in FIG. 1, a spindle stock 2 of a turret lathe 1 has a spindle 3 rotatably supported with an axial center CT1 as its center and a chuck 5 fixed at one end of the spindle 3 (that is, on the right side of FIG. 1). A workpiece 6 is attachably and detachably held by the chuck 5. A tool rest 7 is arranged so as to be freely moved in an arrow X direction and in an arrow Z direction which are orthogonal to each other with respect to the spindle stock 2, and has a turret base 8 free to swing in a direction as shown by arrows A and B with a B-axis set in a perpendicular direction with respect to a paper (a Y direction), orthogonal to the X direction and the Z direction, as an axial center CT2, and a turret 10 supported by the turret base 8 so as to be indexably rotated in a perpendicular plane with an axial center CT3 orthogonal to the axial center CT2 (the B-axis) as its center. The turret 10 has a turret body 10a having a plurality of positions for attaching tool, and one of a plurality of positions for attaching tool is one for a complex tool, and a tool spindle (not shown), rotatable with an axial center CT4 as its center, is located thereon. A normal tool 11 for turning is attached on a normal position for attaching tool, and a complex tool 12 is attached on the position for attaching tool for the complex tool so as to be freely attached thereto and detached therefrom.

And, the tool rest 7 may have a position for attaching tool for a rotating tool. Such tool rest 7 has a driving means (not shown) and a milling spindle (not shown) to be rotated and driven through the driving means which are provided in the turret 10 for executing drilling machining or fraise machining such as milling machining by attaching a rotational tool such as a drill or an end mill thereto.

Figure 2:
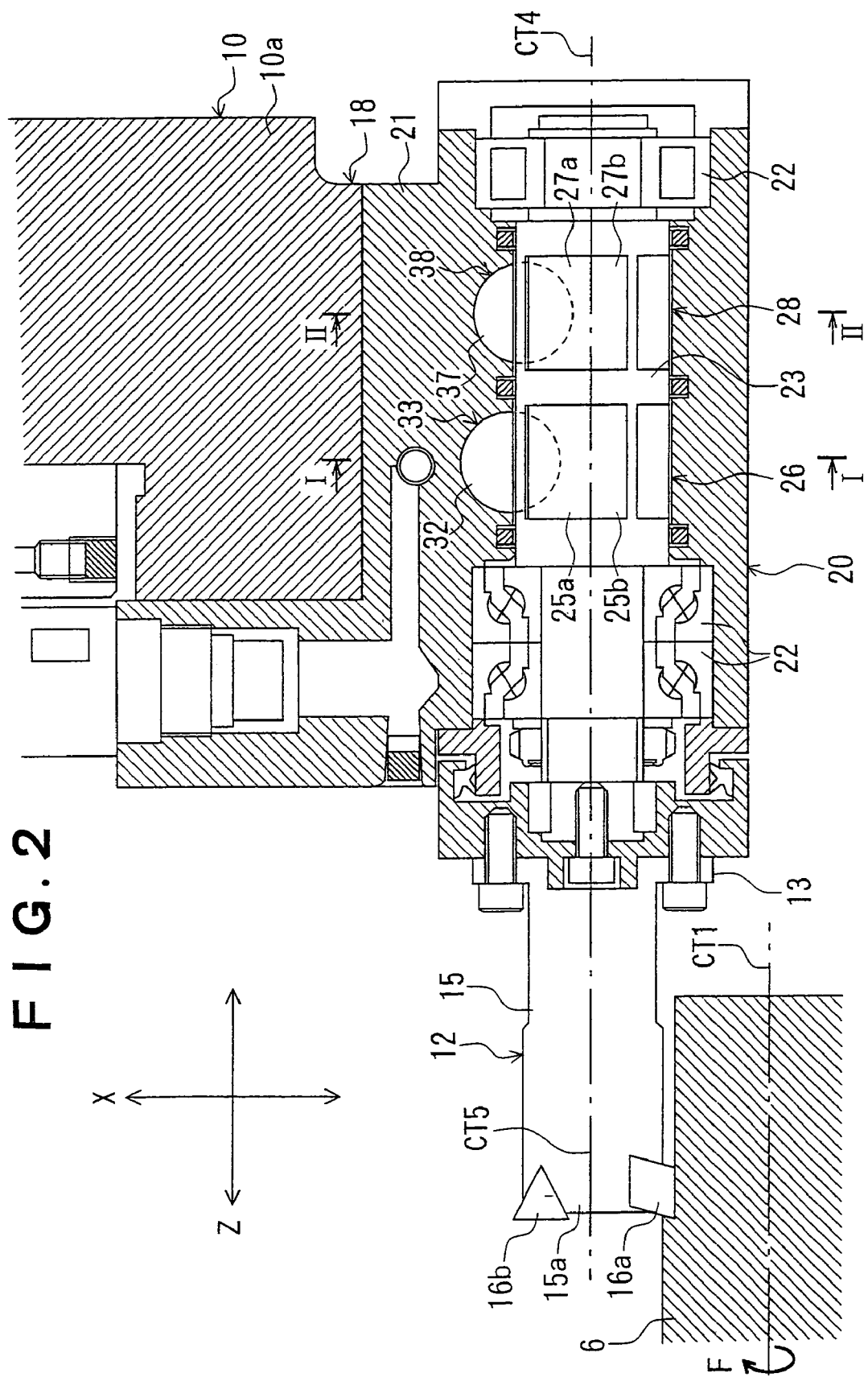
FIG. 2 is a sectional view showing a position for attaching tool for a complex tool on the turret according to the invention.

The complex tool 12 to be used in the invention has a flange portion 13 to be attached to a tool spindle mentioned hereinafter, and a main body 15 in the shape of a round bar, projecting from the flange portion 13, having smaller diameter rather than the flange portion 13, as shown in FIG. 2. A plurality of cutting edges 16 (16a, 16b, . . . ) are attachably and detachably fixed at a top end portion 15a of the main body 15 (a left side end portion of FIG. 2) apart a predetermined space from each other. The complex tool to be used in the invention is not limited to the exemplary complex tool 12, but can have the shape fit for target machining as long as it can be attached to a tool spindle mentioned hereinafter. In this embodiment, the complex tool 12 is explained, so the explanation of the complex tool 12 in the other embodiments is omitted.

A portion for attaching tool 20 is formed at the turret body 10a so as to connect with the turret body 10a, as shown in FIG. 2 (In the figure, the portion for attaching tool 20 is shown separately from the turret 10 for convenience of explanation.). The portion for attaching tool 20 has a tool spindle 23 rotatably supported with the axial center CT4 as its center by a housing 21 as a base portion through bearings 22, 22, and the complex tool 12 is detachably attached to an end of the tool spindle 23 (the left side of the figure) such that the axial center CT4 of the tool spindle 23 and an axial center CT5 of the complex tool 12 are corresponded with each other.

At a center portion of the tool spindle 23, an operation portion 26 where a rectangle is formed with a plurality of planes 25 (25a through 25d), for indexably rotating the tool spindle 23 and comprising an engagement portion for clamping the tool spindle 23 at the index rotational position, and an operation portion 28 where a rectangle is formed with a plurality of planes 27 (27a through 27d), comprising an engagement portion for indexably rotating the tool spindle 23, are formed. A number of the respective planes 25a through 25d or 27a through 27d forming the operation portion 26 or 28 is the same as a number of locations for attachment of cutting edges which are formed at the complex tool 12, and a phase around its axial center CT4 and CT5 is corresponded to the location for attachment of a cutting edge which is formed at the complex tool 12. With such a structure, the operation portions 26, 28 are respectively formed in the shape of almost regular polygon (In this embodiment, the number of the locations for attachment of cutting edges of the complex tool 12 is four (4) and the operation portions 26 and 28 are respectively formed in the shape of an almost square.).

At a position corresponding to the operation portion 26 of the tool spindle 23 of the housing 21, a fluid pressure cylinder 30 (only "the cylinder 30" hereinafter) is formed, and at the both end portions thereof, ports 31a and 31b which are an entrance and an exit of fluid are formed, as shown in FIG. 3(a). A piston 32 is slidably installed in the cylinder 30. The piston 32 has a clamp face 33a as a clamping portion for restricting rotation of the tool spindle 23 by contacting with one of the planes 25a through 25d formed on the operation portion 26 in the shape of a rectangle of the tool spindle 23, and a driving portion 32b for indexably rotating the tool spindle 23 almost half of a required index rotational angle by contacting with one of the planes 25a through 25d. The cylinder 30 and the piston 32 comprise an actuator 33.

At a position corresponding to the operation portion 28 of the tool spindle 23 of the housing 21, a fluid pressure cylinder 35 (only "the cylinder 35" hereinafter) is formed, and at the both end portions thereof, ports 36a and 36b which are an entrance and an exit of fluid pressure, are formed, as shown in FIG. 3(d). A piston 37 is slidably installed in the cylinder 35. The piston 37 has a driving portion 37a for indexably rotating the tool spindle 23 almost half of a required index rotational angle by contacting with one of the planes 27a through 27d formed on the operation portion 28 of the tool spindle 23. And, the cylinder 35 and the piston 37 comprises an actuator 38.

That is, the piston 32 comprises the clamping means of the tool spindle 23, and the pistons 32, 37 comprise the index rotational means of the tool spindle 23 in this embodiment.

FIG. 3(a) shows such a state that the clamp face 32a of the piston 32 is abutted on the plane 25d of the tool spindle 23 so as to clamp the tool spindle 23 at the index rotational position. At the time of this state, the driving portion 37a of the piston 37 is not contacted with the planes 27a through 27d of the tool spindle 23, as shown in FIG. 3(d).

In order to indexably rotate the tool spindle 23, starting from the above-mentioned state, the inside of the cylinder 30 is supplied with fluid pressure through the port 31b as shown in FIG. 3(b) so as to move the piston 32 in a direction as shown by an arrow C. Then, the clamp face 32a of the piston 32 leaves the plane 25d of the tool spindle 23 and the clamping state of the tool spindle 23 is released, such that the tool spindle 23 can rotate.

Subsequently, the inside of the cylinder 35 is supplied with fluid pressure through the port 36a as shown in FIG. 3(e) so as to move the piston 37 in a direction as shown by an arrow D. Then, the driving portion 37a of the piston 37 contacts with the plane 27a of the tool spindle 23 so as to press the plane 27a in the direction as shown by the arrow D. At this time, the pressing force acts on the tool spindle 23 as a rotating force so as to rotate the tool spindle 23 in a direction as shown by an arrow E since the position where the plane 27a of the operation portion 28 and the driving portion 37a of the piston 37 are contacted with each other is eccentric to the axial center CT4 of the tool spindle 23 on the piston 37 side. Then, the tool spindle 23 is rotated about 45 degrees in the direction as shown by an arrow E.

And, the inside of the cylinder 35 is supplied with fluid pressure through the port 36b so as to move the piston 37 in the direction as shown by the arrow C, as shown in FIG. 3(f). Then, the driving portion 37a of the piston 37 leaves the plane 27a of the tool spindle 23, such that the tool spindle 23 is in a free state having no contact with the pistons 32, 37.

Subsequently, the inside of the cylinder 30 is supplied with fluid pressure through the port 31a so as to move the piston 32 in the direction as shown by the arrow D, as shown in FIG. 3(c). Then, the driving portion 32b of the piston 32 is abutted on the plane 25a of the tool spindle 23 so as to press the plane 25a in the direction as shown by the arrow D. At this time, the pressing force acts on the tool spindle 23 as a rotating force so as to rotate the tool spindle 23 about 45 degrees in a direction as shown by an arrow E since the position where the plane 25a and the driving portion 32b of the piston 32 are contacted with each other is eccentric to the axial center CT4 of the tool spindle 23 on the piston 32 side.

When the piston 32 is moved in the direction as shown by the arrow D as shown in FIG. 3(a), the clamp face 32a of the piston 32 is abutted on the plane (25a) of the tool spindle 23. This state shows the tool spindle 23 (that is, the complex tool 12 attached to the tool spindle 23) indexed 90 degrees. That is, the respective planes 25a through 25d are moved, rotating 90 degrees, as known from a reference number in a parenthesis in FIG. 3(a). At the same time, the tool spindle 23 (that is, the complex tool 12 attached to the tool spindle 23) is clamped by the clamp face 32a of the piston 32. At this time, the tool spindle 23 is similarly rotated on the cylinder 35 side, and the respective planes 27a through 27d are thereby rotated 90 degrees and moved, as known from a reference number in a parenthesis in FIG. 3(d) changed from the state as shown in FIG. 3(f).

As explained before, the complex tool 12 attached to the tool spindle 23 is indexed by rotating, such that the desired cutting edge 16 (16a, 16b, . . . ) to be used for machining can be positioned at a machining position and can be used. That is, using the turret 10 having a position for attaching tool for complex tool, the complex tool 12 is fixed by the tool spindle 23 on the position for attaching tool for complex tool, and the complex tool 12 is indexed by its rotation according to the routines as shown in FIG. 3 so as to elect the cutting edge 16 to be used for machining from among the cutting edges 16 (16a, 16b, . . . ) on the complex tool 12 (the cutting edge 16a in case of FIG. 2), and thereafter, the tool spindle 23 is clamped so as to fix by the housing 21. In this way, the cutting edge 16a necessary for machining can be selected from among a plurality of cutting edges 16 (16a through 16d) of the complex tool 12.

As shown in FIG. 2, turning machining (outer diameter machining) can be executed on an outer peripheral face of the workpiece 6 in such a manner that the cutting edge 16a necessary for machining is selected from among the complex tool 12 and the tool spindle 23 is clamped, the spindle 3 (see FIG. 1) is rotated so as to rotate the workpiece 6 at a predetermined rotational speed in a direction as shown by an arrow F with the axial center CT1 as its center, and in this rotating state, the turret 10 is properly moved in the arrow X direction and in the arrow Z direction, and the cutting edge 16a cuts in the outer peripheral face of the workpiece 6.

Figure 4:
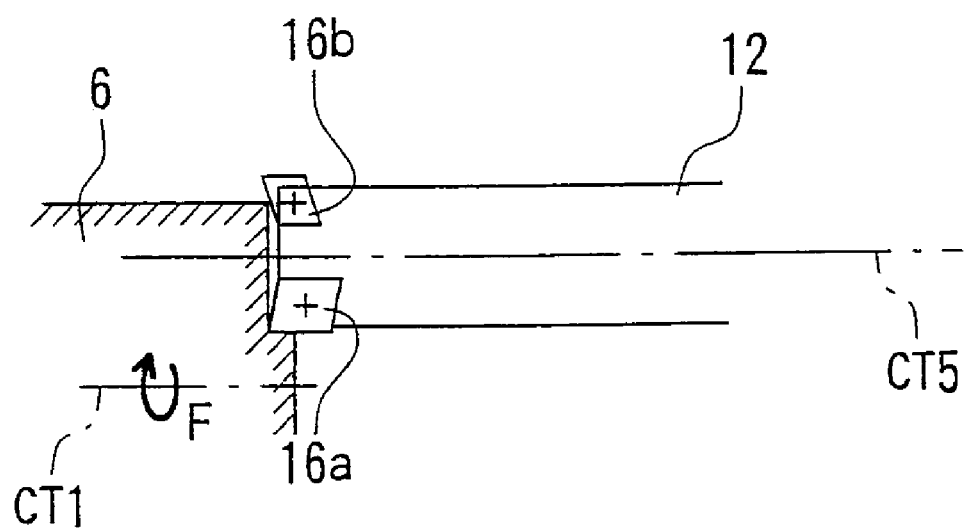
FIG. 4 is a schematic view showing machining on an end face of a workpiece by the complex tool supported by the turret according to the invention.

As shown in FIG. 4, turning machining can be executed on an end face of the workpiece 6 in such a manner that the cutting edge 16a of the complex tool 12 is selected, the turret 10 is properly moved in the arrow X direction and in the arrow Z direction with respect to the workpiece 6 rotating at a predetermined rotating speed in the arrow F direction with the axial center CT1 of the spindle 3 as its center, and the cutting edge 16a of the complex tool 12 cuts in an the end face of the workpiece 6.

Figure 5:
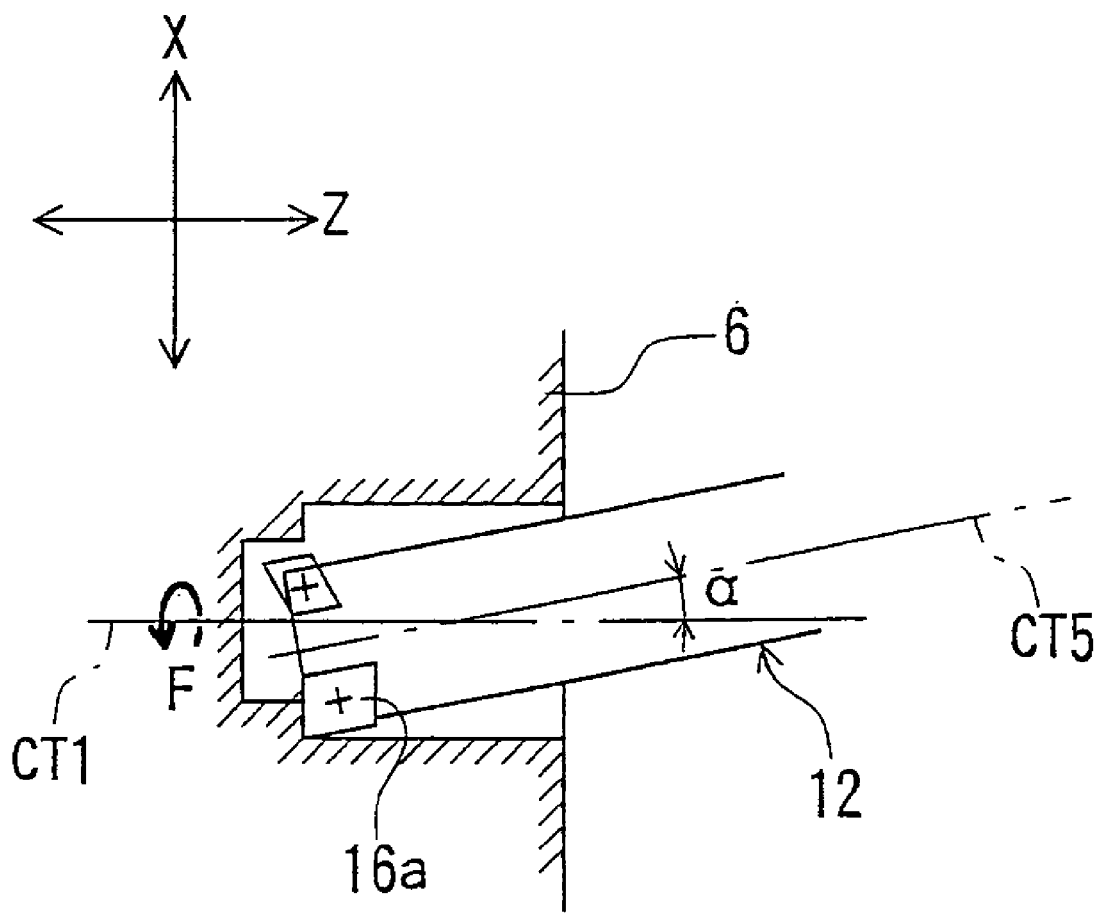
FIG. 5 is a schematic view showing a machining on an inner diameter of a workpiece by the complex tool supported by the turret according to the invention.

In order to execute inner diameter machining for broadening the diameter of the hole of the workpiece 6 by turning machining, as shown in FIG. 5, the tool rest 7 (see FIG. 1) is turned in the direction as shown by the arrow A with the axial center CT2 of the B-axis as its center so as to position according to a machining program so that the B-axis angle α between the axial center CT1 of the spindle 3 (that is, the workpiece 6) and the axial center CT5 of the complex tool 12 becomes 10 degrees, for instance. On the other hand, the tool spindle 23 is indexed by rotating so as to select the cutting edge 16a necessary for machining among from a plurality of cutting edges 16 attached to the complex tool 12, and the tool spindle 23 (that is, the complex tool 12) is clamped. In the above-mentioned state, the workpiece 6 is rotated in the direction as shown by the arrow F with the axial center CT1 as its center so as to properly move the turret 10 with respect to the workpiece 6 in the arrow X direction and in the arrow Z direction. Then, turning machining is executed on the inner peripheral face of the hole of the workpiece 6 by cutting in the inner peripheral face of the workpiece 6 by the cutting edge 16a of the complex tool 12, and the inner diameter machining can be thereby executed.

In the case of the machining for forming a slot 6a on the outer diameter of the workpiece 6 as shown in FIG. 6(a) or the case of the machining for forming a screw 6c on the outer diameter of the workpiece 6 as shown in FIG. 6(b), the tool rest 7 is turned in the direction as shown by the arrow A with the axial center CT2 of the B-axis as its center according to a machining program, and is positioned such that the B-axis angle a between the axial center CT1 of the spindle 3 (that is, the workpiece 6) and the axial center CT5 of the complex tool 12 becomes 20 degrees, for instance. On the other hand, the tool spindle 23 is indexed by rotating so as to select the cutting edge 16b necessary for machining out of a plurality of cutting edges 16a, 16b, . . . attached to the complex tool 12. And, the tool spindle 23 (that is, the complex tool 12) is clamped. In the above-mentioned state, the workpiece 6 is rotated in the direction as shown by the arrow F so as to properly move the turret 10 in the arrow X direction and in the arrow Z direction with respect to the workpiece 6. Then, turning is executed on the workpiece 6 by cutting in the outer peripheral face of the workpiece 6 by the cutting edge 16b of the complex tool 12 so as to form the slot 6a or the screw 6c. In the case of the machining for forming the slot 6a on the outer diameter of the workpiece 6, chamfering on both end portions 6b, 6b can be also executed at the same time of turning on the slot 6a due to the shape of the cutting edge 16b.

In case of the machining for forming the slot 6a on the inner diameter of the workpiece 6 as shown in FIG. 7(a) or the machining for forming the screw 6c on the inner diameter of the workpiece 6 as shown in FIG. 7(b), the tool rest 7 is turned in the direction as shown by the arrow A with the axial center CT2 of the B-axis as its center according to a machining program, and is positioned such that the B-axis angle α between the axial center CT1 of the spindle 3 (that is, the workpiece 6) and the axial center CT5 of the complex tool 12 becomes 20 degrees, for instance. On the other hand, the tool spindle 23 is indexed by rotating so as to select the cutting edge 16b necessary for machining from among a plurality of cutting edges 16a, 16b, . . . attached to the complex tool 12, and the tool spindle 23 (that is, the complex tool 12) is clamped. In the above-mentioned state, the workpiece 6 is rotated in the direction as shown by the arrow F so as to properly move the turret 10 in the arrow X direction and in the arrow Z direction with respect to the workpiece 6. Then, the cutting edge 16b of the complex tool 12 cuts in the inner peripheral face of the workpiece 6, so that turning machining is executed on the inner peripheral face of the workpiece 6, and the slot 6a or the screw 6c can be formed. In the case of the machining for forming the slot 6a on the inner diameter of the workpiece 6, chamfering on both end portions 6b, 6b can be also executed at the same time of turning on the slot 6a due to the shape of the cutting edge 16b.

Figure 8:
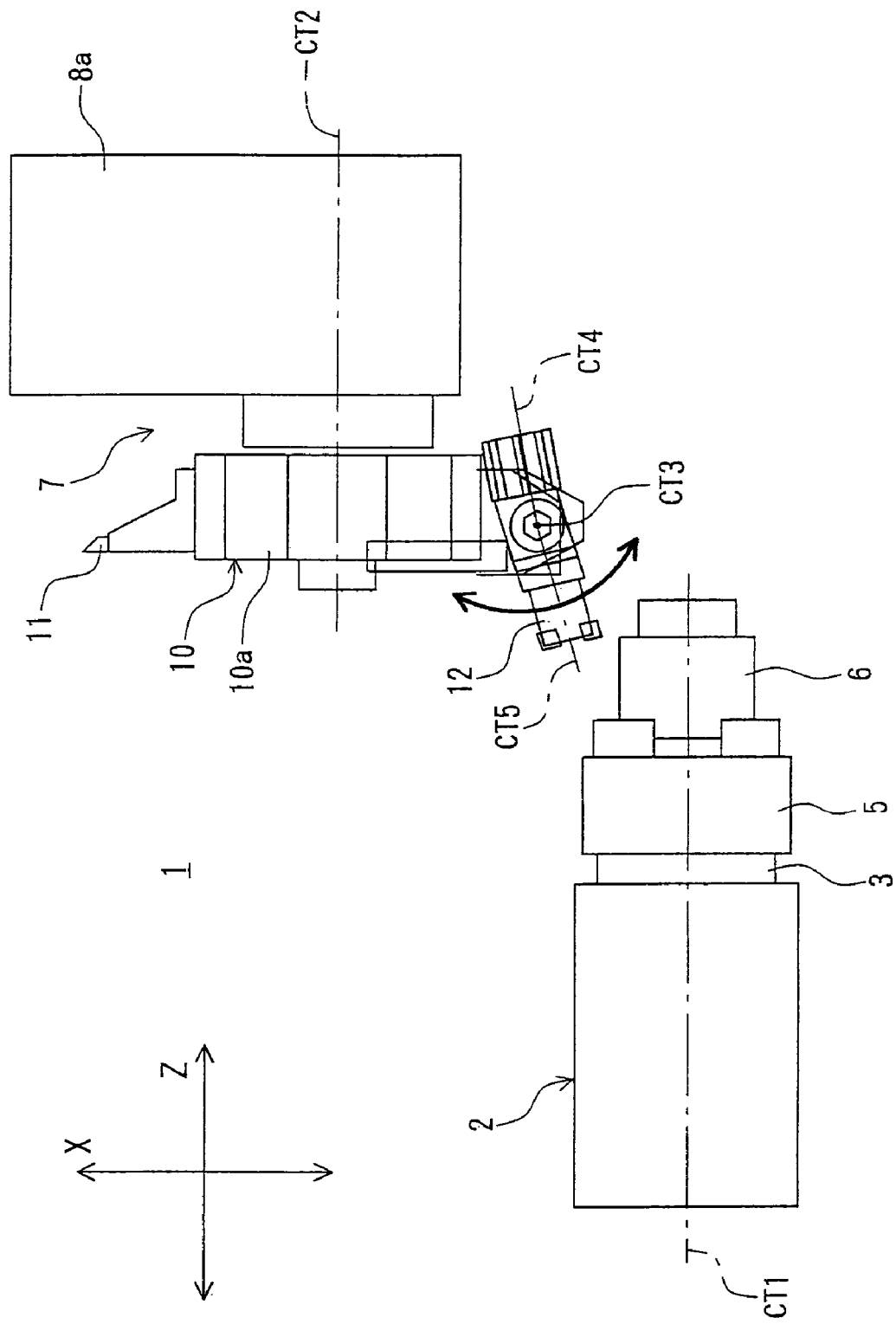
FIG. 8 is a plan view showing a positional relation between the spindle stock and the tool rest in the turret lathe.
Figure 9:
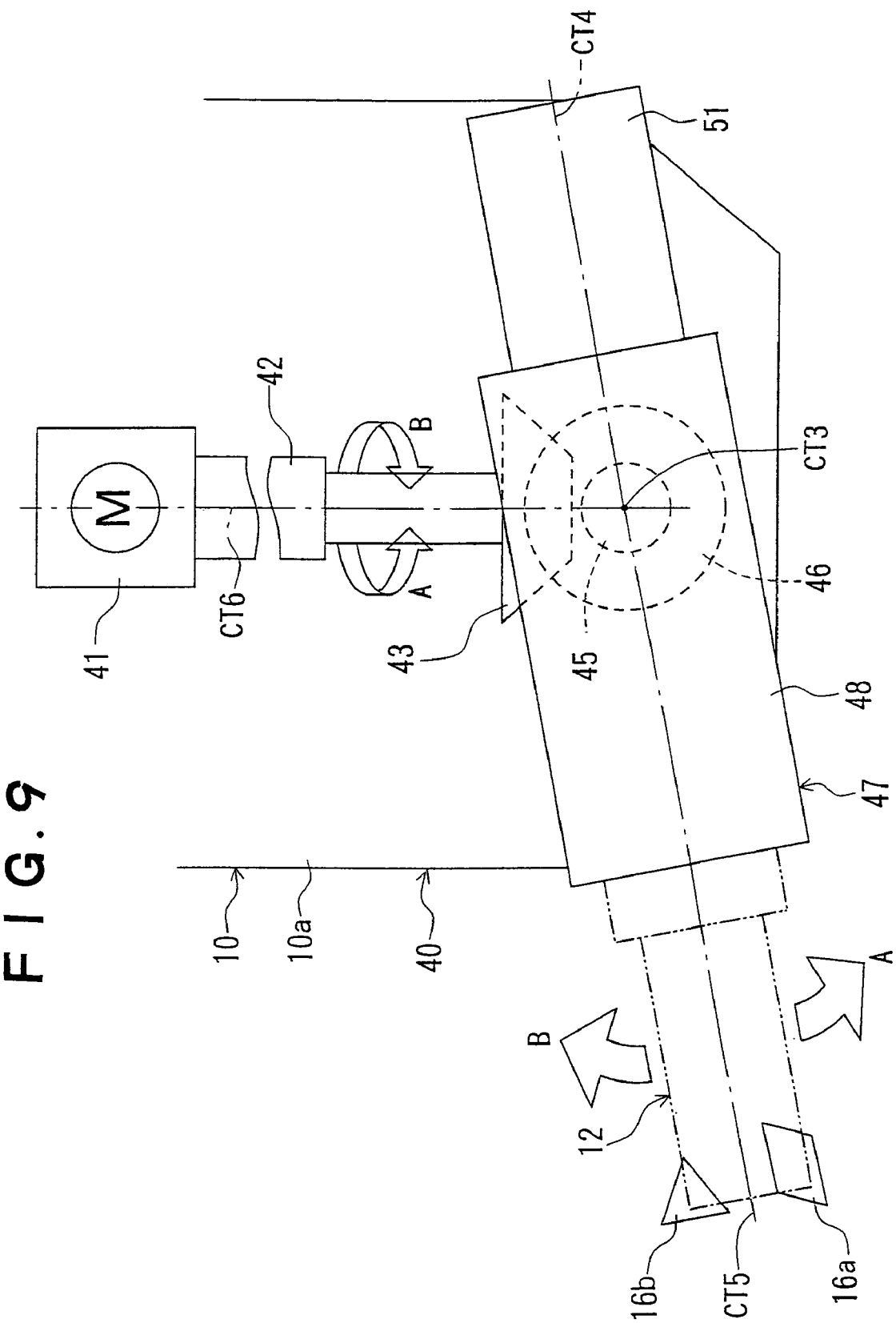
FIG. 9 is a plan view showing B-axis rotational mechanism in the position for attaching tool for the complex tool on the turret according to the invention.
Figure 10:
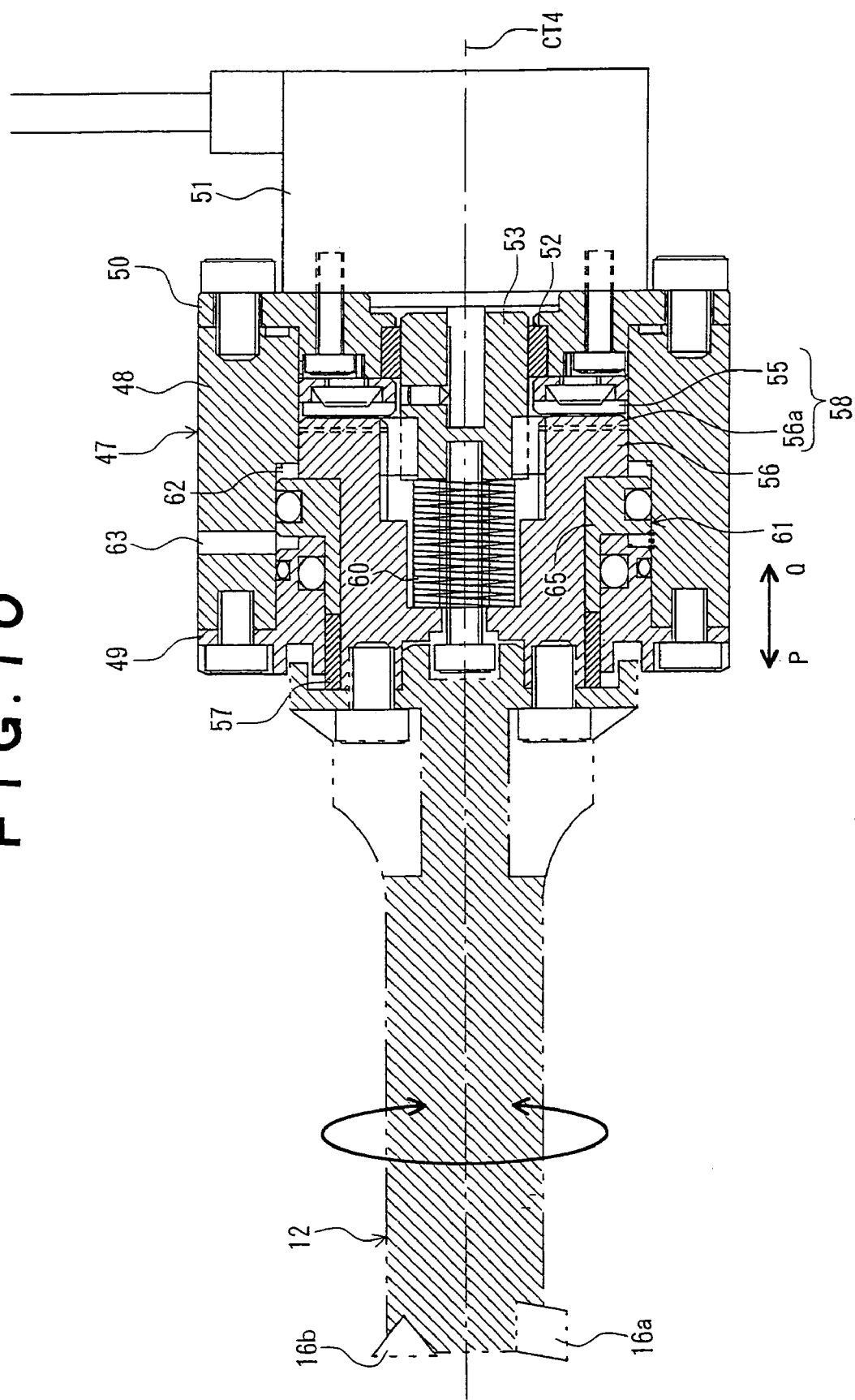
FIG. 10 is a plan view showing a portion for attaching tool for the complex tool on the turret according to the invention.
Figure 11:
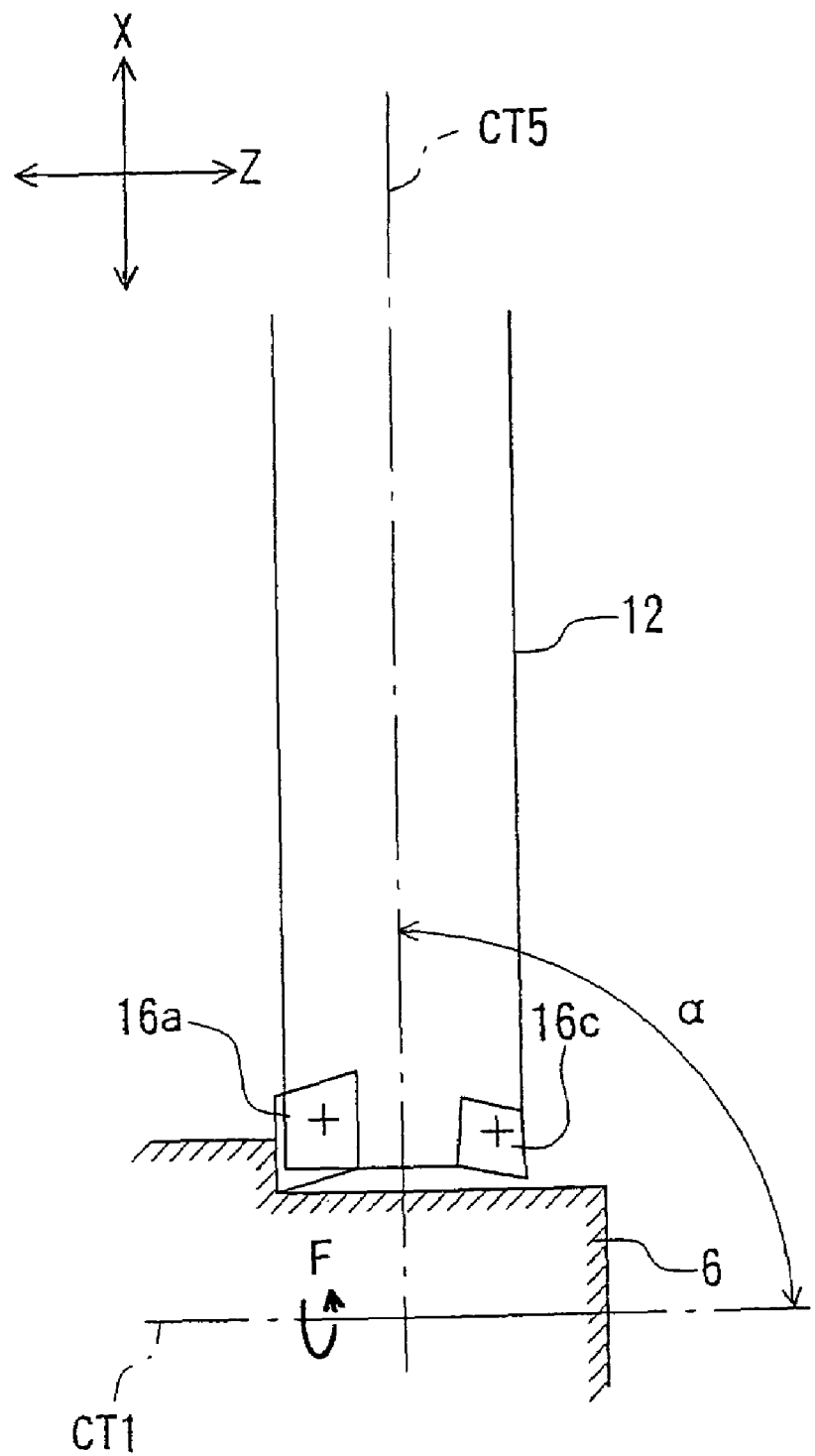
FIG. 11 is a schematic view showing turning machining on an outer diameter of the workpiece by the turret according to the invention.
Figure 12:
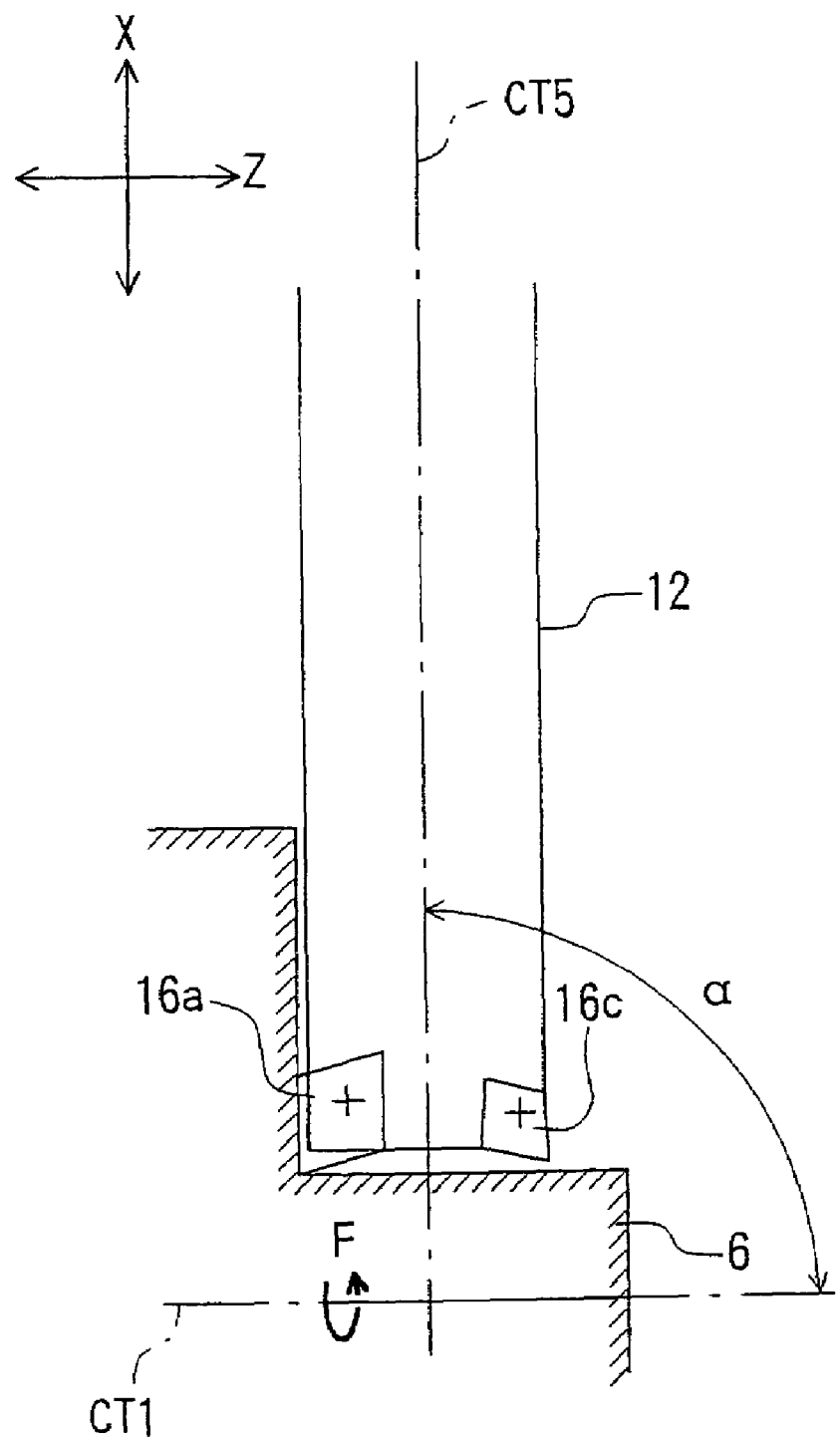
FIG. 12 is a schematic view showing turning machining on an end face of an outer diameter by the turret according to the invention.
Figure 13:
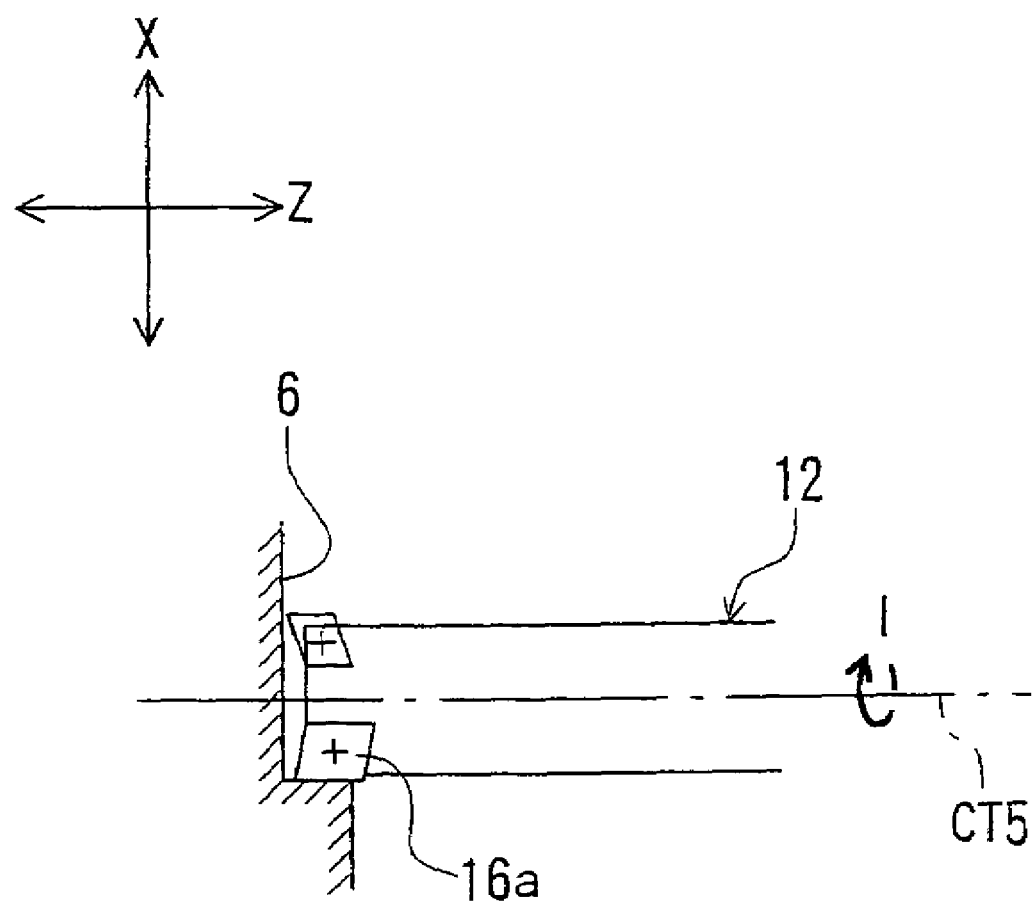
FIG. 13 is a schematic view showing milling machining on an end face of an outer diameter by the turret according to the invention.

FIGS. 8 through 13 show the second embodiment of the turret according to the invention. FIG. 8 is a plan view showing a positional relation between the spindle stock and the tool rest in the turret lathe, FIG. 9 is a plan view showing B-axis rotational mechanism in the position for attaching tool for a complex tool on the turret according to the invention, FIG. 10 is a plan view showing a portion for attaching tool for the complex tool on the turret according to the invention, FIG. 11 is a schematic view showing turning machining on an outer diameter of the workpiece by the turret according to the invention, FIG. 12 is a schematic view showing turning machining on an end face of an outer diameter by the turret according to the invention, and FIG. 13 is a schematic view showing milling machining on an end face of an outer diameter by the turret according to the invention.

As shown in FIG. 8, the spindle stock 2 of the turret lathe 1 has the spindle 3 rotatably supported with an axial center CT1 as its center and the chuck 5 fixed at one end of the spindle 3 (on the right side of FIG. 1). The workpiece 6 is attachably and detachably held by the chuck 5. The tool rest 7 has a turret base 8a arranged so as to be freely moved in the arrow X direction and in the arrow Z direction which are orthogonal to each other with respect to the spindle stock 2, and the turret 10 supported by the turret base 8a so as to be indexably rotated in a perpendicular plane with the axial center CT2 as its center. The turret 10 has a plurality of positions for attaching tool, and the tool spindle (not shown) rotatable with an axial center CT4 as its center is arranged on one of a plurality of positions for attaching tool, and this position is for attaching the complex tool.

The tool spindle (not shown) on which the complex tool 12 is installed is supported by the turret 10 so as to be rotated with the axial center CT3 of the B-axis as its center when the tool spindle is positioned at a machining position by the turret 10. The B-axis is set in a perpendicular direction with respect to a paper (the Y direction), orthogonal to the arrow X direction and the arrow Z direction. The normal tool 11 for turning is detachably attached at the normal position for attaching tool, and the complex tool 12 is detachably attached at the position for attaching tool for the complex tool so as to correspond the axial center CT4 of the tool spindle for attaching the complex tool 12 and the axial center CT5 of the complex tool 12 with each other.

As shown in FIG. 9, a position for attaching tool 40 for the complex tool of the turret body 10a of the turret 10 is provided with a B-axis indexing motor 41 and a transmission shaft 42 arranged in a radial direction with respect to the axial center CT2 (see FIG. 8) of the turret 10. The transmission shaft 42 is supported rotatable with the axial center CT6 as its center, and is connected with the B-axis indexing motor 41. A bevel gear 43 is fixed at one end of the transmission shaft 42 (the lower side of the figure). A rotational axis 45 is rotatably supported by the turret 10 with the axial center CT3 of the B-axis orthogonal to the respective axial centers CT4 and CT6 as its center at an intersection between the axial center CT4 of the tool spindle (not shown) and the axial center CT6 of the transmission shaft 42. A bevel gear 46 engaging with the bevel gear 43 is fixed at one end of the rotational axis 45. And, the rotational axis 45 is fixed on a portion for attaching tool 47 for the complex tool.

The driving of the B-axis indexing motor 41 rotates the bevel gear 43 in the direction as shown by the arrows A and B, so that the portion for attaching tool 47 can swing in the direction as shown by the arrows A and B with the axial center CT2 of the B-axis as its center.

As shown in FIG. 10, the portion for attaching tool 47 has a housing 48 as a base portion. A head stock 49 and a tail stock 50 are fixed at both ends in front and rear direction of the housing 48 (in the direction of the axial center CT4 of the tool spindle, described hereinafter). A motor 51 is fixed on the tail stock 50, and a joint 53 rotatably and slidably supported by the tail stock 50 through a bearing 52 is fixed on the rotational shaft of the motor 51. And, an annular anchoring coupling 55 having an end face where a plurality of teeth are radially formed apart a predetermined space from each other is fixed by the tail stock 50.

A tool spindle 56 for attaching the complex tool 12 is rotatably slidably supported by the head stock 49 through a bearing 57. A clamping means 58 for clamping the tool spindle 56 at its indexed rotational position is comprised of the anchoring coupling 55, a spindle coupling 56*a* and a driving means 61 described hereinafter. The spindle coupling 56*a* is comprised of a plurality of teeth which are radially formed a part a predetermined space from each other so as to engage with the anchoring coupling 55 at a rear end of the tool spindle 56 (at the right side of the figure). And, the tool spindle 56 is slidably connected with the joint 53 through a plurality of disc springs 60 formed between this and the joint 53, and is always energized in the top end direction (the left side of the figure).

The motor 51 may have a rotary encoder. The motor 51 has both functions, a milling function of successively rotating the tool spindle 56 and a multipoint orientation function of detecting rotational angle by a rotary encoder so as to index the tool spindle 56 by its rotation. Then, the motor 51 can properly rotate and drive the tool spindle 56, including successive rotation and index rotation in such a state that the engagement between the spindle coupling 56*a* and the anchoring coupling 55 is released. That is, the multipoint orientation function of the motor 51 comprises an indexing means for the tool spindle 56.

The driving means 61 is comprised of a fluid pressure cylinder 62 (only "the cylinder 62" hereinafter) formed by an annular space enclosed by the housing 48, the head stock 49, the tool spindle 56 and the bearing 57, and an annular piston 65 arranged slidable in the cylinder 62. The housing 48 is provided with a port 63 which is an entrance and an exit of fluid with respect to the cylinder 62. An elastic force of the disc spring 60 and the fluid pressure supplying the piston 65 move the tool spindle 56 in a direction as shown by the arrows P and Q.

When the cylinder 62 is not supplied with fluid, the tool spindle 56 is pushed in the direction as shown by the arrow P by the elastic force of the disc spring 60 and the engagement between the spindle coupling 56*a* and the anchoring coupling 55 is released, so that the tool spindle 56 can rotate. Therefore, the tool spindle 56 can be rotated for indexing by the multipoint orientation function of the motor 51 or can be normally successively rotated in such a state that the cylinder 62 is not supplied with fluid. Then, the tool spindle 56 is successively rotated, and a drilling machining and a fraise machining, such as a milling machining, can be executed, thereby.

When the cylinder 62 is supplied with fluid pressure and the tool spindle 56 is moved in the direction as shown by the arrow Q through the piston 65, the spindle coupling 56*a* and the anchoring coupling 55 are engaged with each other so as to become the clamping state, and the rotation of the tool spindle 56 is thereby restricted. Therefore, the cylinder 62 is supplied with fluid pressure after the tool spindle 56 is rotated for indexing so as to clamp the tool spindle 56, and turning machining can be thereby executed.

When stopping supplying the cylinder 62 with fluid pressure in the state of the tool spindle 56 clamped, the tool spindle 56 is moved in the direction as shown by the arrow P by the elastic force of the disc spring 60, and the engagement between the spindle coupling 56*a* and the anchoring coupling 55 is cut so as to release the clamping state of the tool spindle 56.

The motor 51 may drive the tool spindle 56 through intermittent rotational mechanism, such as Geneva mechanism, so as to simply index the tool spindle 56 by rotating.

Using of the turret 10 according to the second embodiment makes machining as shown in FIGS. 11 through 13 possible, in addition to various kinds of machining as shown in FIGS. 2, 4 through 7, similar to the turret 10 (FIG. 2) according to the first embodiment.

In order to execute turning machining on the outer diameter of the workpiece 6 as shown in FIG. 11, the cutting edge 16*a* of the complex tool 12 is selected according to a machining program, and the B-axis angle α of the axial center CT5 of the complex tool 12 with respect to the axial center CT1 of the workpiece 6 is set at 92 degrees, for instance. The complex tool 12 is fixed, and the workpiece 6 is rotated in the direction as shown by the arrow F at a predetermined rotational speed. And, the turret 10 is properly moved with respect to the workpiece 6 in the arrow X direction and in the arrow Z direction, and then, the outer diameter of the workpiece 6 can be turned by cutting in the outer peripheral face of the workpiece 6 by the cutting edge 16*a* of the complex tool 12.

In case of turning machining on the end face of the outer diameter of the workpiece 6 as shown in FIG. 12, the cutting edge 16*a* of the complex tool 12 is selected according to a machining program, and the B-axis angle α of the axial center CT5 of the complex tool 12 with respect to the axial center CT1 of the workpiece 6 is set at 91 degrees, for instance. The complex tool 12 is fixed, and the workpiece 6 is rotated in the direction as shown by the arrow F at a predetermined rotational speed. And, the turret 10 is properly moved in the arrow X direction and in the arrow Z direction with respect to the workpiece 6. Then, the end face of the outer diameter of the workpiece 6 can be turned by cutting in the end face of the workpiece 6 by the cutting edge 16*a* of the complex tool 12.

In order to execute milling machining for forming a step or a slot on the end face of the workpiece 6 as shown in FIG. 13, the positioning is executed according to a machining program such that the B-axis angle α between the axial center CT1 of the spindle 3 (that is, the workpiece 6) and the axial center CT5 of the complex tool 12 becomes 0 degree. On the other hand, the spindle 3 (see FIG. 8) is fixed so as to fix the workpiece 6 held by the chuck 5, and the clamping state of the tool spindle 56 is released, so that the tool spindle 56 can be rotated. And, the tool spindle 56 is successively rotated so as to successively rotate the complex tool 12 at a predetermined rotational speed in the direction as shown by the arrow I. In the above-mentioned state, the end face of the workpiece 6 is cut in by the cutting edge 16*a* of the complex tool 12, properly moving the turret 10 in the arrow X direction and in the arrow Z direction, so that the milling machining can be executed.

In the case of the machining as shown in FIGS. 11 and 12, the turret base 8a of the tool rest 7 of the turret lathe 1 has no B-axis function (see FIG. 8). If the turret base 8 of the turret lathe 1 has the B-axis function (see FIG. 1) or the sufficient B-axis rotational angle can be taken in the direction as shown by the arrows A and B in the position for attaching tool for the complex tool (see FIG. 9), machining as shown in FIGS. 14 and 15, for instance, are possible in addition to various kinds of machining as shown in FIGS. 2, 4 through 7, 11 through 13.

Figure 14:
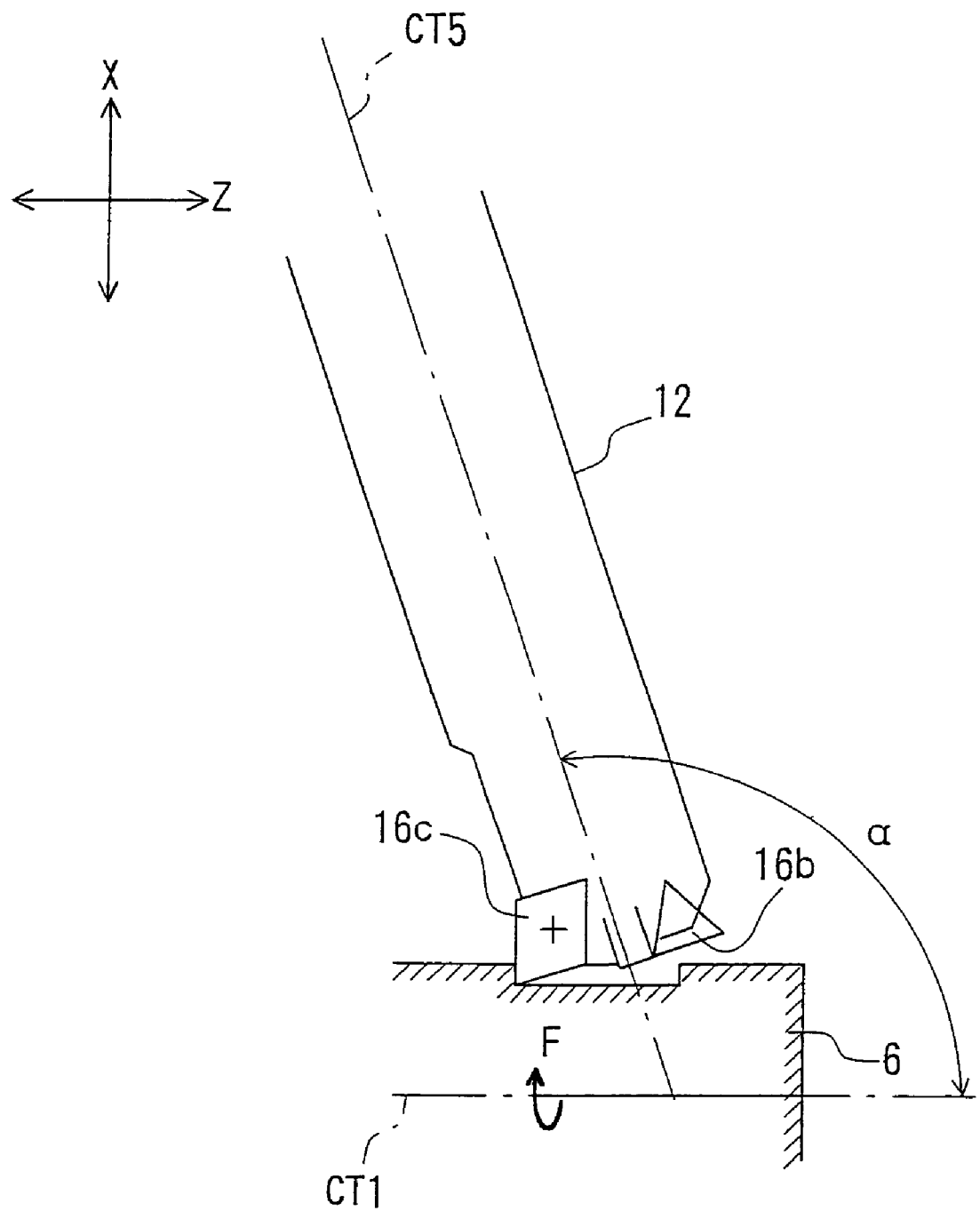
FIG. 14 is a schematic view showing turning machining on an outer diameter by the turret according to the invention.

In case of a grooving machining by turning the outer diameter of the workpiece 6 as shown in FIG. 14, the cutting edge 16c is selected according to a machining program, and the B-axis angle α of the axial center CT5 of the complex tool 12 with respect to the axial center CT1 of the workpiece 6 is set at 110 degrees, for instance, by the B-axis function of the turret base 8a or the B-axis function of the position for attaching tool. The complex tool 12 is fixed, and the workpiece 6 is rotated in the direction as shown by the arrow F at a predetermined rotational speed. And, the turret 10 is properly moved in the arrow X direction and in the arrow Z direction with respect to the workpiece 6. Then, grooving machining can be executed on the outer diameter of the workpiece 6 by cutting in the outer peripheral face of the workpiece 6 by the cutting edge 16c of the complex tool 12.

Figure 15:
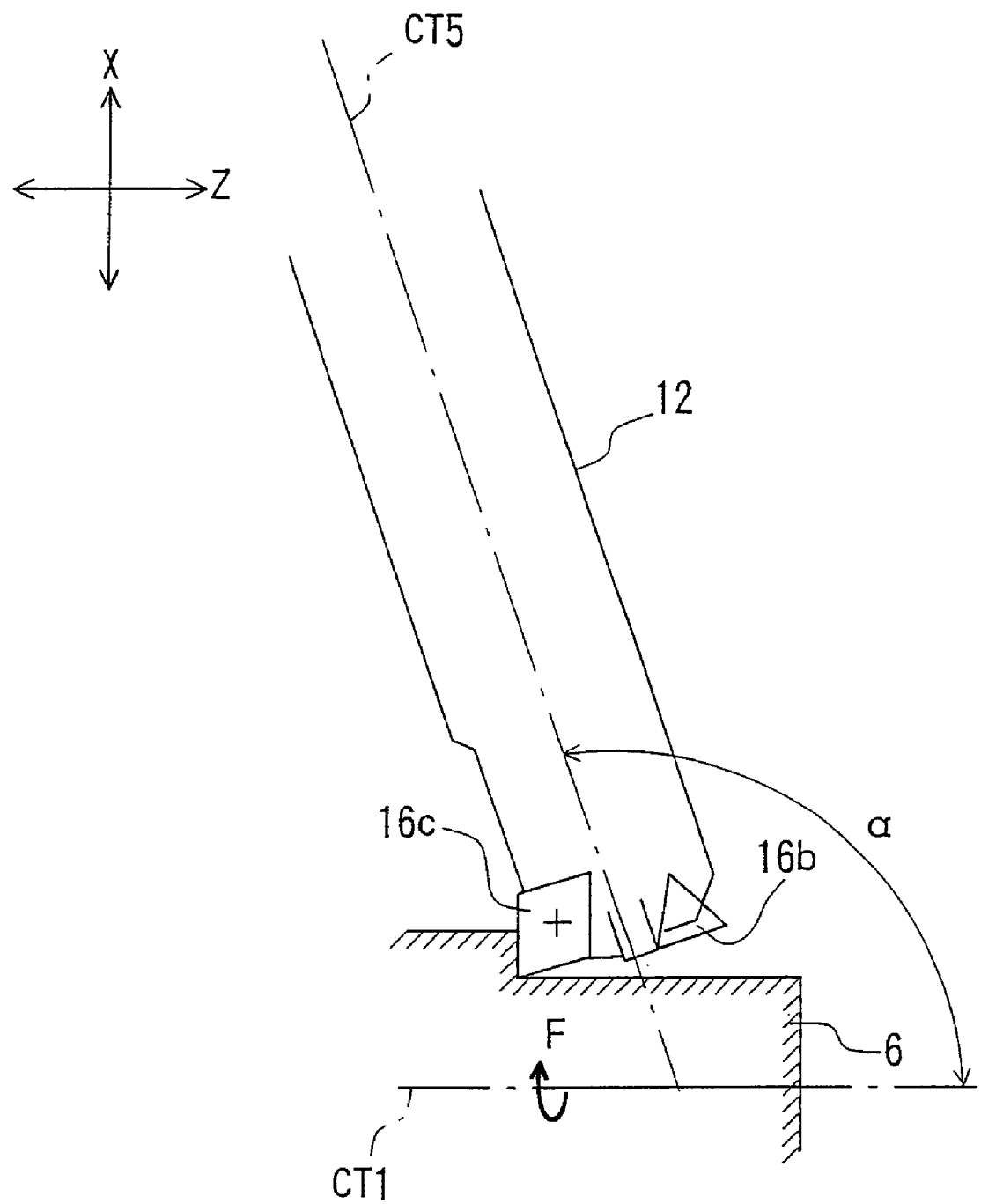
FIG. 15 is a schematic view showing recessing machining on an outer diameter by the turret according to the invention.

In order to execute recessing machining by turning the outer diameter of the workpiece 6, as shown in FIG. 15, the cutting edge 16c is selected according to a machining program, and the B-axis angle a of the axial center CT5 of the complex tool 12 with respect to the axial center CT1 of the workpiece 6 is positioned at 105 degrees, for instance by the B-axis function of the turret base 8a or the B-axis function of the position for attaching tool. And, the complex tool 12 is fixed, and the workpiece 6 is rotated in the direction as shown by the arrow F at a predetermined rotational speed. Then, the turret 10 is properly moved in the arrow X direction and in the arrow Z direction with respect to the workpiece 6. Then, recessing machining can be executed on the outer diameter of the workpiece 6 by cutting in the outer peripheral face of the workpiece 6 by the cutting edge 16c of the complex tool 12.

Figure 16:
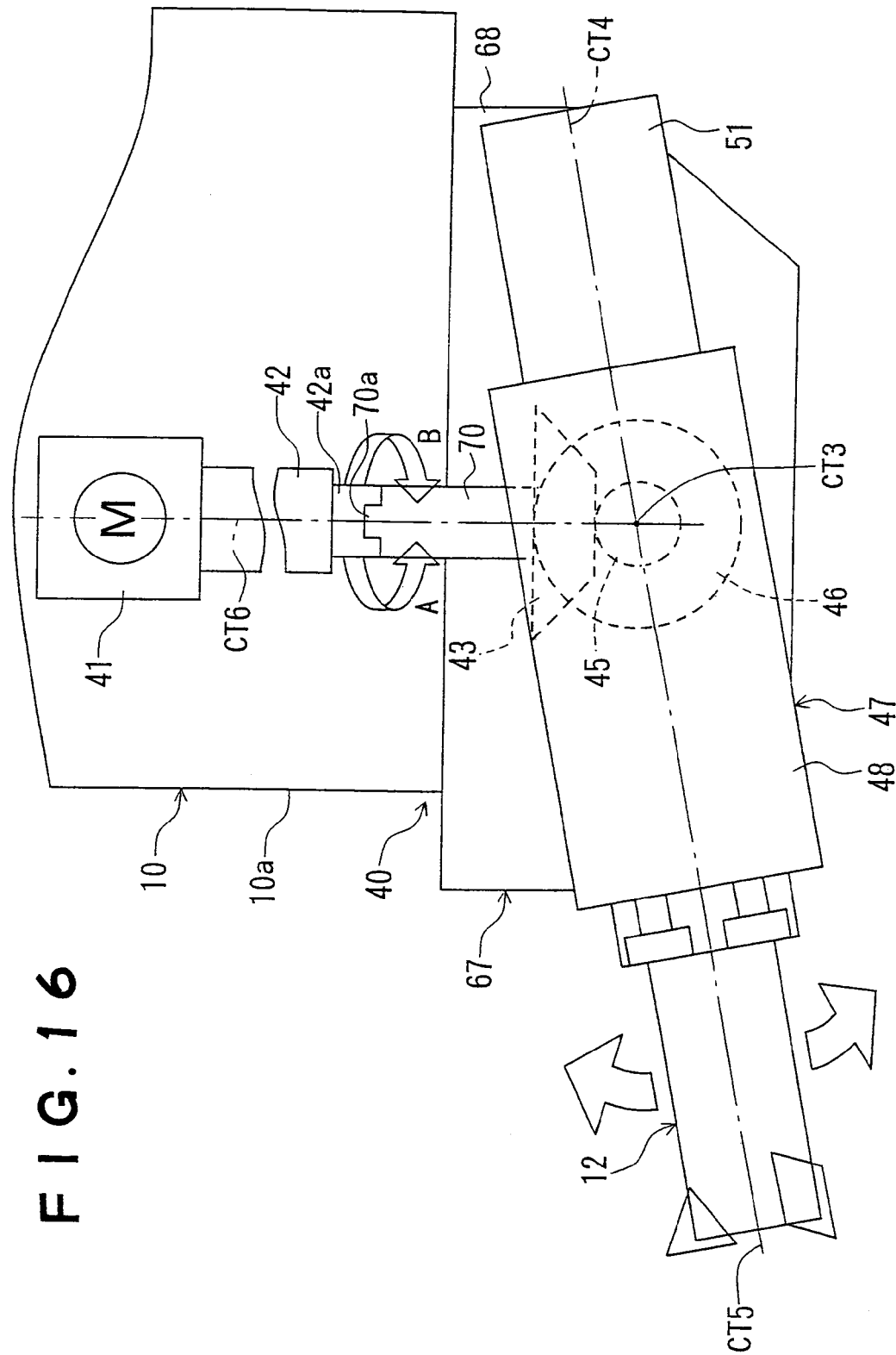
FIG. 16 is a plan view showing the position for attaching tool for attaching the complex tool on the turret according to the invention.

FIG. 16 shows the third embodiment of the turret, and is a plan view showing the position for attaching tool, for attaching the complex tool on the turret according to the invention.

In FIG. 16, the same reference number is attached to an element the same as one in FIGS. 8 through 10, so that its explanation is omitted. A clutch 42a is formed at one end of the transmission shaft 42 connected with the B-axis indexing motor 41. An adaptor 67 has a base portion 68 attachably and detachably fixed by the position for attaching tool 40 for the complex tool of the turret body 10a of the turret 10, and a transmission shaft 70 is rotatably supported by the base portion 68. A clutch 70a engaging with the clutch 42a is formed at one end of the transmission shaft 70, and the bevel gear 43 engaging with the bevel gear 46 is fixed at the other end. The portion for attaching tool 47 is fixed by the rotational axis 45 connected with the bevel gear 46. The other structure is the same as one as shown in FIG. 10, and the function of the turret 10 is also the same as the second embodiment, so the explanation is omitted.

In such a structure, it is sufficient to simply provide the turret 10 with the B-axis indexing motor 41 which is a driving source of B-axis rotation (which may also function as an existing motor for driving mill spindle) and the transmission shaft 42, and it is easy to produce the turret 10, thereby. Besides, it is easy to produce the adaptor 67 since it may be produced, separately from the turret 10.

The portion for attaching tool 20 in the first embodiment (see FIG. 2) maybe formed separately from the turret 10, and thereafter it may be fixed to the turret 10 so as to unite with each other, similar to the portion for attaching tool 47 and the adaptor 67 in the present embodiment.

Figure 17:
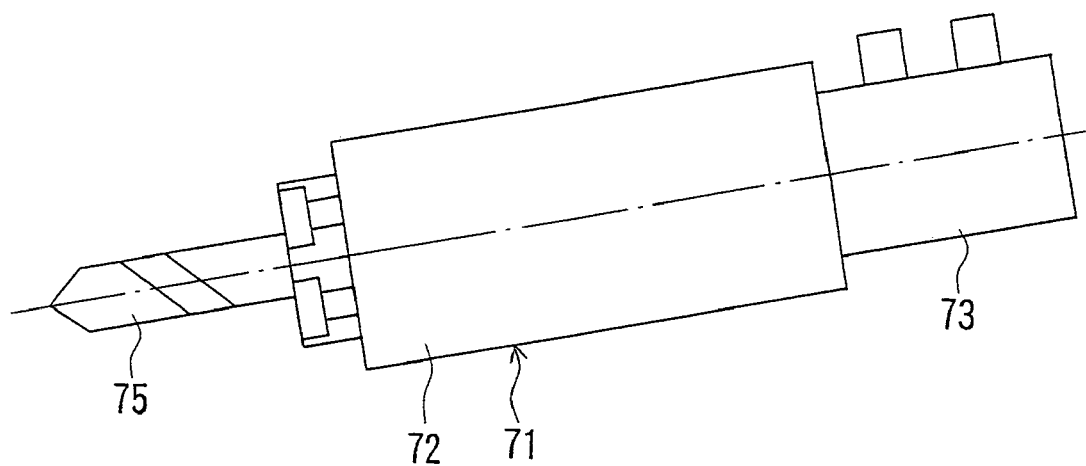
FIG. 17 is a plan view showing a portion for attaching tool on the turret according to the invention.

FIG. 17 shows the fourth embodiment of the turret, and is a plan view showing a portion for attaching tool on the turret according to the invention.

As shown in FIG. 17, the structure of a portion for attaching tool 71 is that a tool spindle (not shown) is rotatably supported in a housing 72, the tool spindle is rotated and driven by an air motor 73, and a rotational tool, such as a drill 75, is attached to the tool spindle.

If the portion for attaching tool 71 is detachably attached to the turret 10 or the adaptor 67 in the second and the third embodiments (see FIGS. 9 and 16), and the portion for attaching tool 47 in the respective embodiments is also detachably attached to the turret 10 or the adaptor 67, milling machining with the drill 75 or an end mill (not shown) will be possible by exchanging the portion for attaching tool 47, 71 if necessary in addition to turning machining.

Figure 18:
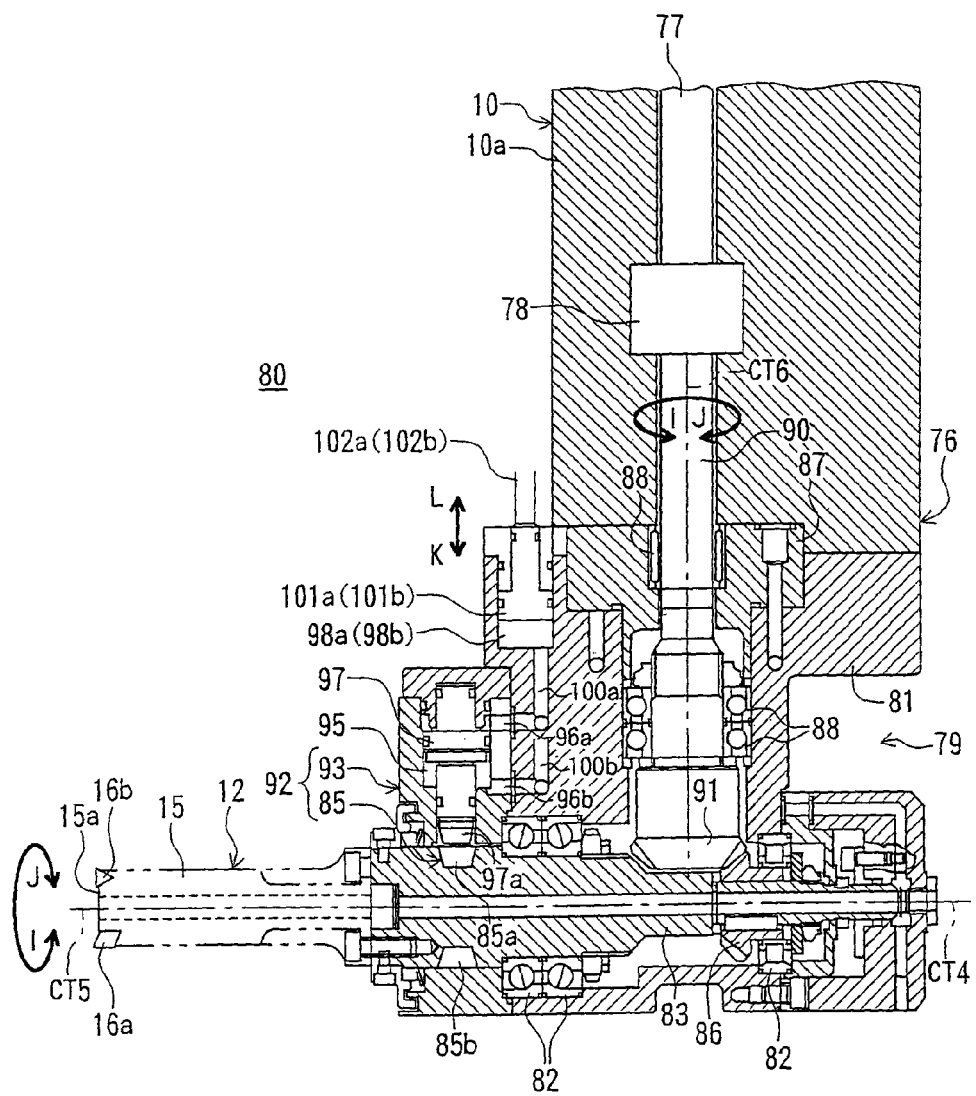
FIG. 18 is a sectional view showing an adaptor built in the turret according to the invention.

FIG. 18 shows the fifth embodiment of the turret, and is a sectional view showing an adaptor built in the turret.

In FIG. 18, a mill spindle 77 and a clutch 78 (such as a hydraulic clutch and an electric clutch) are located on one of a plurality of positions for attaching tool 76, formed on the turret body 10a of the turret 10 of the turret lathe 1 (see FIGS. 1 and 8). An adaptor 80 as a portion for attaching tool is located at the position for attaching tool 76, and comprises a part of the turret 10.

The adaptor 80 has a housing 81 comprising a part of the turret 10, and a tool spindle 83 is rotatably supported by the housing 81 through bearings 82, 82 with the axial center CT4 as its center. The complex tool 12 (or a milling tool which is not shown in the figure) is attached to an end of the tool spindle 83 (the left side of the figure) so as to be freely attached thereto and detached therefrom such that the axial center CT4 of the tool spindle 83 and the axial center CT5 of the complex tool 12 are corresponded with each other. A plurality of holes 85 (85a, 85b, . . . ) (the same number as one of locations for tool attachment of the complex tool 12) are formed at one end of the tool spindle 83 (the left side of the figure) such that the tool spindle 83 can be fixed at an indexed position when the tool spindle 83 is indexed by rotating. And, a bevel gear 86 is fixed at the other end of the tool spindle 83 (the right side of the figure).

A transmission shaft 90 is supported by a transmission shaft case 87 fixed by the housing 81 through bearings 88, 88, being rotatable with an axial center CT6 as its center. One end of the transmission shaft 90 is connected with the mill spindle 77 located inside the turret 10 through the clutch 78. A bevel gear 91 engaging with the bevel gear 86 is fixed at the other end of the transmission shaft 90 (the lower side of the figure) Then, the transmission shaft 90 is rotated and driven in a direction as shown by arrows I and J by the operation of the mill spindle 77, and the tool spindle 83 (that is, the complex tool 12) is thereby rotated and driven in the direction as shown by the arrows I and J.

The mill spindle 77 is rotated and driven by a motor having a rotary encoder therein (not shown), for instance. The motor has both functions, a milling function of successively rotating the tool spindle 83 and a multipoint orientation function of detecting rotational angle by a rotary encoder so as to index the tool spindle by its rotation. That is, the multipoint orientation function of the motor comprises an indexing means for the tool spindle 83. In case of no use of the B-axis function of the turret 10 in the fourth embodiment, the adaptor 80 may be attached at the attachment position of the adaptor 67 instead of the adaptor 67 by using the B-axis indexing motor 41 as shown in FIG. 16 as a mill spindle driving motor and using the transmission shaft 42 as the mill spindle.

A clamping means 92 for clamping the tool spindle 83 is comprised of the hole 85 (85a, 85b, . . . ) formed at the tool spindle 83 and a clamp unit 93 located at the side (the left side of the figure) of the housing 81. The clamp unit 93 is fixed by the housing 81 so as to correspond to the hole 85. And, the clamping unit 93 is provided with a fluid pressure cylinder 95 (only "the cylinder 95" hereinafter) and ports 96a and 96b are respectively formed at the both end portions thereof as an entrance and an exit of fluid. A piston 97 is slidably installed in the cylinder 95, and a clamping portion 97a in the shape of a taper, attachably and detachably fittable in the hole 85 (85a, 85b, . . . ) formed at the tool spindle 83 is formed at one end of the piston 97 (the lower side of the figure).

Respectively independent fluid pressure cylinders 98a and 98b (only "the cylinder 98a (98b)" hereinafter) (only cylinder 98a is shown in the figure) are formed at the position adjacent to the clamp unit 93 of the housing 81. The port 96a (96b) formed at the cylinder 95 of the clamp unit 93 is connected with the cylinder 98a (98b) through fluid path 100a (100b). A piston 101a (10b) (only piston 101a is shown in the figure) is installed in the cylinder 98a (98b), being free to be slided.

Fluid is entered into an upper space of the piston 97 of the cylinder 95, the fluid path 100a, a lower space of the piston 101a of the cylinder 98a, an lower space of the piston 97 of the cylinder 95 (the tool spindle 83 side), the fluid path 101b and a lower space of the piston 101b of the cylinder 98b. An operation rod 102a (102b) (only operation rod 102a is shown in the figure) is located at the turret 10 so as to oppose the piston 101a (10b) apart a minimal space therefrom when fixing the adaptor 80 on the turret 10 (see FIG. 1), and is driven in a direction as shown by arrows K and L by a driving source (not shown).

When the operation rod 102a is moved in the direction as shown by the arrow K so as to press the piston 101a in the direction as shown by the arrow K, the fluid in the cylinder 98a passes through the fluid path 100a and is supplied to the upper space of the piston 97 of the cylinder 95. Then, the piston 97 is moved in the direction as shown by the arrow K for the tool spindle 83 by its fluid pressure, and the clamping portion 97a of the top end thereof is fitted in the hole 85 (85a, 85b, . . . ) of the tool spindle 83 so as to clamp the tool spindle 83 and restrict the rotation thereof. At this time, the piston 101b is pushed out by the piston 97 of the cylinder 95, and is moved in the direction as shown by the arrow L by the fluid flowing from the fluid path 100b into the cylinder 98b.

In such a clamping state that the clamping portion 97a of the piston 97 is fitted in the hole 85 (85a, 85b, . . . ) of the tool spindle 83 so as to restrict the rotation of the tool spindle 83 as mentioned before, turning machining can be executed by the cutting edge 16a (16b, . . . ) of the complex tool 12.

When moving the operation rod 102b in the direction as shown by the arrow K so as to push the piston 101b in the direction as shown by the arrow K, the fluid in the cylinder 98b passes through the fluid path 100b and is supplied into the lower space of the piston 97 of the cylinder 95. Then, the piston 97 is moved in the direction as shown by the arrow L departing from the tool spindle 83 by the fluid pressure and the clamping portion 97a of the top end thereof is detached from the hole 85 (85a, 85b, . . . ) of the tool spindle 83, such that the clamping state of the tool spindle 83 is released. At this time, the piston 101a is pushed out by the piston 97 of the cylinder 95 and is moved in the direction as shown by the arrow L by the fluid flowing from the fluid path 100a into the cylinder 98a.

In such a state that the clamping of the tool spindle 83 is released so that the tool spindle 83 can be rotated as described before, the tool spindle 83 is indexed by rotating through the transmission shaft 90 by intermittently rotating the mill spindle 77, so that the cutting edge 16a, 16b, . . . located on the complex tool 12 can be selected. Besides, the tool spindle 83 can be successively rotated through the transmission shaft 90 by successively rotating the mill spindle 77, and drilling machining and fraise machining such as milling machining wherein the complex tool 12 is successively rotated are thereby possible. That is, turning machining and milling machining as shown in FIG. 2, 4 through 7 and 11 through 15 are possible with the complex tool 12, similar to the above-mentioned respective embodiments even if the adaptor 80 and the turret are united with each other.

The mill spindle 77 for indexing and successively rotating the tool spindle 83 provided at the turret body 10a as shown in the present embodiment makes the adaptor 80 smaller, and makes fear of interference with the workpiece 6 slighter, so that the operability of the turret lathe can be improved.

Figure 19:
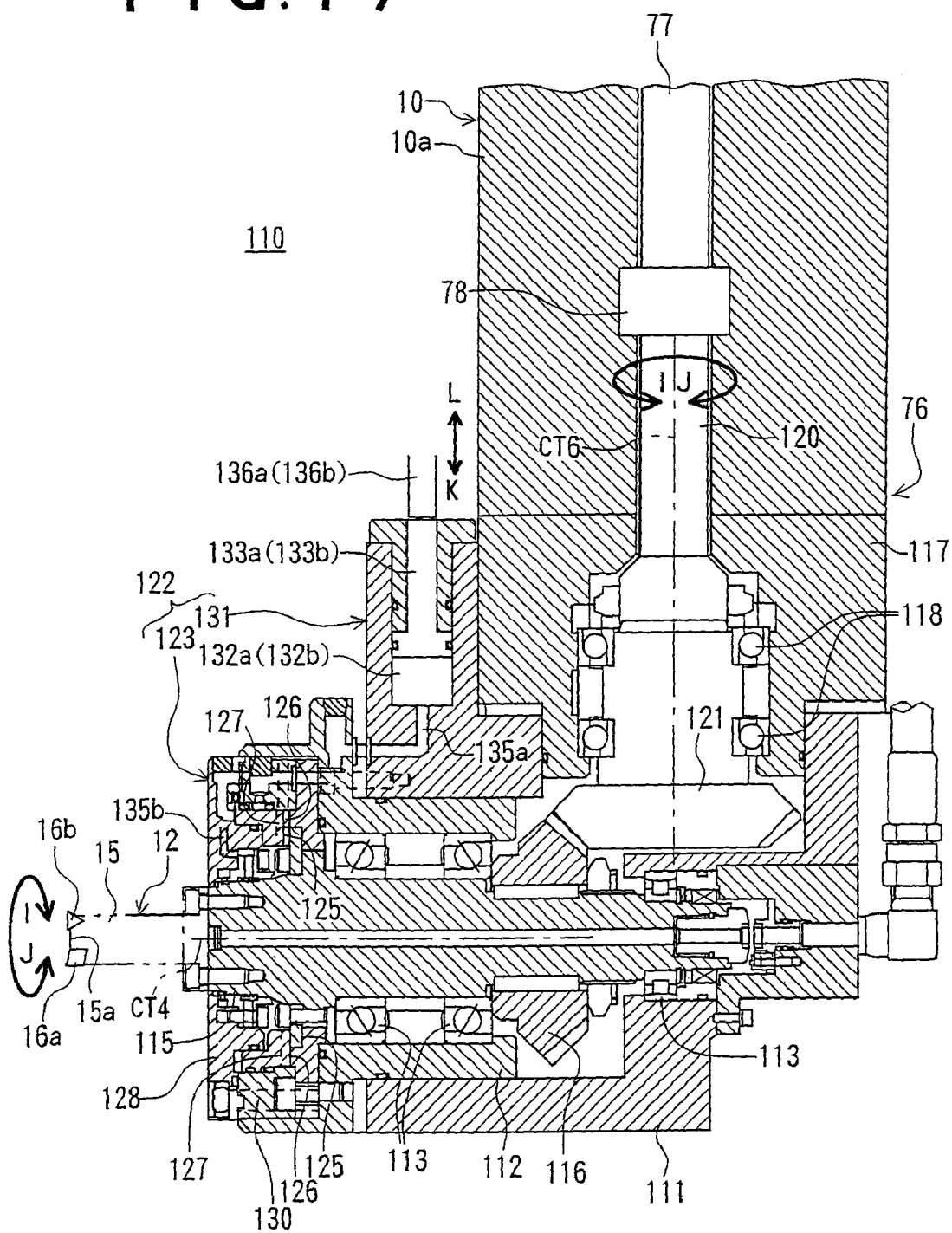
FIG. 19 is a sectional view showing the adaptor built in the turret according to the invention.

FIG. 19 shows the sixth embodiment of the turret, and is a sectional view showing the adaptor built in the turret.

In FIG. 19, the mill spindle 77 and the clutch 78 (such as a hydraulic clutch and an electric clutch) are located on one of a plurality of positions for attaching tool 76, formed on the turret body 10a of the turret 10 of the turret lathe 1 (see FIGS. 1 and 8). An adaptor 110 as a portion for attaching tool is located at the position for attaching tool 76, and comprises a part of the turret 10.

The adaptor 110 has a housing 111 comprising a part of the turret 10, and the housing 111 is provided with a tool spindle 115 rotatably supported by bearings 113, 113 with the axial center CT4 as its center in a bearing case 112 fixed by the housing 111. The complex tool 12 (or a milling tool which is not shown in the figure) is fixed by an end of the tool spindle 115 (the left side of the figure) so as to be freely attached thereto and detached therefrom such that the axial center CT4 of the tool spindle 115 and the axial center CT5 of the complex tool 12 are corresponded with each other. A bevel gear 116 is fixed at the center portion of the tool spindle 115.

A transmission shaft 120 is rotatably supported by a transmission shaft case 117 fixed by the housing 111 through bearings 118, 118 with the axial center CT6 as its center. One end of the transmission shaft 120 connects with the mill spindle 77 located inside the turret 10 through the clutch 78. At the other end of the transmission shaft 120 (the lower side of the figure), a bevel gear 121 engaging with the bevel gear 116 is fixed. The operation of the mill spindle 77 rotates and drives the transmission shaft 120 in the direction as shown by the arrows I and J, so that the tool spindle 115 (that is, the complex tool 12) is rotated and driven in the direction as shown by the arrows I and J.

The mill spindle 77 is rotated and driven by a motor having a rotary encoder therein (not shown), for instance. The motor has both functions, a milling function of successively rotating the tool spindle 115 and a multipoint orientation function of detecting rotational angle by a rotary encoder so as to index the tool spindle 115 by its rotation. That is, the multipoint orientation function of the motor comprises an indexing means for the tool spindle 115.

A clamping means 122 for fixing the tool spindle 115 at its indexed rotational position is comprised of a three bladed coupling 123 and its driving unit 131. In order to explain the working state of the three bladed coupling 123, an unclamping state is shown on the upper side of the tool spindle 115 and a clamping state is shown on the lower side of the tool spindle 115 in FIG. 19.

The three bladed coupling 123 is comprised of an annular spindle coupling 125 fixed by the tool spindle 115 having a plurality of teeth radially formed on its end face so as to have a predetermined space therebetween, an annular anchoring coupling 126 fixed by the bearing case 112 so as to position on the outer periphery of the spindle coupling 125, having the end face where a plurality of teeth are radially formed apart a predetermined space from each other, and an anullar clamp coupling 127 having the end face opposing to the spindle coupling 125 and the anchoring coupling 126 where a plurality of teeth respectively engaging with the teeth of the spindle coupling 125 and the anchoring coupling 126 are radially formed apart a predetermined space from each other. The clamp coupling 127 is supported by an annular space formed by a head stock 128 fixed by the bearing case 112 and a sealing ring 130, slidable in a direction parallel to the axial center CT4 of the tool spindle 115.

The driving unit 131 is comprised of a pair of fluid pressure cylinders 132a, 132b (only cylinder 132a is shown in the figure) (only "the cylinder 132a (132b) hereinafter), which are independently formed in the housing 111, and pistons 133a, 133b respectively installed in the cylinders 132a, 132b being free to be slided. The cylinder 132a is connected with an end of the above-mentioned space installing the clamp coupling 127 therein (the left side in the figure) through a fluid path 135a, and the cylinder 132b is connected with the other end of the space installing the clamp coupling 127 therein (the rightside in the figure) through a fluid path 135b.

And, fluid is entered in the space formed by the cylinder 132a and the piston 133a, the fluid path 135a, one end of the space (the left side space of the clamp coupling 127), the space formed by the cylinder 132b and the piston 133b, the fluid path 135b, and the other end of the space (the right side space of the clamp coupling 127). The operation rod 136a (136b) (only operation rod 136a is shown in the figure) is located in the turret 10 so as to oppose the piston 133a (133b) with a minimal space, and is driven in the direction as shown by the arrows K and L by a driving source (not shown).

When the operation rod 136a is moved in the direction as shown by the arrow K so as to push the piston 133a in the direction as shown by the arrow K, the fluid in the cylinder 132a passes through the fluid path 135a, and enters in the left side space of the clamp coupling 127. Then, by its fluid pressure, the clamp coupling 127 is moved on the right side of the figure along the axial center CT4 of the tool spindle 115, and the tooth of the clamp coupling 127 is engaged with the teeth of the spindle coupling 125 and the anchoring coupling 126 as shown in the lower side of the tool spindle 115 in FIG. 19, so that the spindle coupling 125 and the anchoring coupling 126 are combined with each other through the clamp coupling 127, and the tool spindle 115 is thereby clamped so as to restrict its rotation. At this time, the piston 133b is moved in the direction as shown by the arrow L by the fluid extruded from the right side space of the clamp coupling 127 and entered in the cylinder 132b via the fluid path 135b.

As mentioned before, in the state of clamping the tool spindle 115 for restricting its rotation, turning is possible with the cutting edge 16a (16b, . . . ) of the complex tool 12. When the tool spindle 115 is clamped by the three bladed coupling 123, the tool spindle 115 can be clamped with high rigidity. Therefore, the position of the complex tool 12 fixed by the tool spindle 115 can be maintained with high accuracy, and more accurate turning machining is possible.

When the operation rod 136b is moved in the direction as shown by the arrow K so as to push the piston 133b in the direction as shown by the arrow K, the fluid in the cylinder 132b passes through the fluid path 135b, and enters in the space of the right side of the paper of the clamp coupling 127. Then, by its fluid pressure, the clamp coupling 127 is moved on the left side of the figure along the axial center CT4 of the tool spindle 115, and the clamp coupling 127 is departed from the spindle coupling 125 and the anchoring coupling 126 as shown on the upper side of the tool spindle 115 in FIG. 19 so as to release the engagement of these teeth, so that the state of clamping the tool spindle 115 is released so as to allow the tool spindle 115 to rotate. At this time, the piston 133a is moved in the direction as shown by the arrow L by the fluid extruded from the left side space of the clamp coupling 127 and entered in the cylinder 132a via the fluid path 135a.

As mentioned before, in such a state that clamping of the tool spindle 115 is released so as to allow the tool spindle 115 to rotate, the tool spindle 115 is indexed by rotating through the transmission shaft 120 by intermittently rotating the mill spindle 77, so that the cutting edge 16a, 16b, . . . located at the complex tool 12 can be selected. Besides, the tool spindle 115 can be successively rotated through the transmission shaft 120, also by successively rotating the mill spindle 77, so that a drilling machining and a fraise machining, such as a milling machining by successively rotating the complex tool 12 are possible. That is, turning machining and milling machining as shown in FIG. 2, 4 through 7 and 11 through 15 are possible with the complex tool 12, similar to the above-mentioned respective embodiments even if the turret 10 has such a structure, mentioned above.

The mill spindle 77 for indexing and successively rotating the tool spindle 115 provided at the turret body 10a as shown in the present embodiment makes the adaptor 110 smaller, and makes fear of interference with the workpiece 6 slighter, so that the operability of the turret lathe can be improved.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:
1. A turret for turret lathe, comprising:
   a turret body;
   a tool spindle for detachably attaching a complex tool, rotatable with an axial center of said tool spindle as its center, provided at said turret body;
   indexing means for indexably rotating said tool spindle, provided at said turret body; and clamping means for clamping said tool spindle at an indexed position indexed by said indexing means, provided at said turret body.

2. The turret for turret lathe according to claim 1, wherein said indexing means has a plurality of engagement portions formed at a periphery of said tool spindle, corresponding to said indexed position, and an actuator for rotating and driving said tool spindle a predetermined angle by engaging with said engagement portion, provided so as to be reciprocated and driven.

3. The turret for turret lathe according to claim 1, wherein said clamping means has a clamp face provided at said actuator so as to freely engage with said engagement portion of said tool spindle.

4. The turret for turret lathe according to claim 1, wherein said turret body is provided with first means for rotating and driving, and a spindle housing for supporting said tool spindle is located so as to be freely rotated and driven with an axial center as its center, orthogonal to an axial center of said tool spindle, by said first means for rotating and driving.

5. The turret for turret lathe according to claim 4, wherein said indexing means is provided with second means for rotating and driving located at said spindle housing, for freely rotating and driving said tool spindle with said axial center of said tool spindle as its center.

6. The turret for turret lathe according to claim 5, wherein said second means for rotating and driving functions as indexing means for indexing said tool spindle by rotation and milling drive means for successively rotating said tool spindle, thereby executing milling machining by said complex tool.

7. The turret for turret lathe according to claim 5, wherein said spindle housing is free to be attached to and detached from said turret body.

8. The turret for turret lathe according to claim 1, wherein said turret body is provided with a third means for rotating and driving such that said third means for rotating and driving can rotate said tool spindle with said axial center of said tool spindle as its center.

9. The turret for turret lathe according to claim 8, wherein said third means for rotating and driving functions as said indexing means, and milling drive means for successively rotating said tool spindle, thereby executing milling machining by said complex tool.

10. A turret for turret lathe, comprising:
a turret body;
a tool spindle for detachably attaching a complex tool, rotatable with an axial center of said tool spindle as its center, provided at said turret body;
indexing unit for indexably rotating said tool spindle, provided at said turret body; and
clamping unit for clamping said tool spindle at an indexed position indexed by said indexing unit, provided at said turret body.

11. The turret for turret lathe according to claim 10, wherein said indexing unit has a plurality of engagement portions formed at a periphery of said tool spindle, corresponding to said indexed position, and an actuator for rotating and driving said tool spindle a predetermined angle by engaging with said engagement portion, provided so as to be reciprocated and driven.

12. The turret for turret lathe according to claim 10, wherein said clamping unit has a clamp face provided at said actuator so as to freely engage with said engagement portion of said tool spindle.

13. The turret for turret lathe according to claim 10, wherein said turret body is provided with first unit for rotating and driving, and a spindle housing for supporting said tool spindle is located so as to be freely rotated and driven with an axial center as its center, orthogonal to an axial center of said tool spindle, by said first unit for rotating and driving.

14. The turret for turret lathe according to claim 13, wherein said indexing unit is provided with second unit for rotating and driving located at said spindle housing, for freely rotating and driving said tool spindle with said axial center of said tool spindle as its center.

15. The turret for turret lathe according to claim 14, wherein said second unit for rotating and driving functions as indexing unit for indexing said tool spindle by rotation and milling drive unit for successively rotating said tool spindle, thereby executing milling machining by said complex tool.

16. The turret for turret lathe according to claim 13, wherein said spindle housing is free to be attached to and detached from said turret body.

17. The turret for turret lathe according to claim 10, wherein said turret body is provided with a third unit for rotating and driving such that said third unit for rotating and driving can rotate said tool spindle with said axial center of said tool spindle as its center.

18. The turret for turret lathe according to claim 17, wherein said third unit for rotating and driving functions as said indexing unit, and milling drive unit for successively rotating said tool spindle, thereby executing milling machining by said complex tool.

* * * * *